United States Patent
Tsai et al.

(10) Patent No.: US 12,235,409 B2
(45) Date of Patent: Feb. 25, 2025

(54) OPTICAL LENS ASSEMBLY, IMAGING APPARATUS AND ELECTRONIC DEVICE

(71) Applicant: LARGAN PRECISION CO., LTD., Taichung (TW)

(72) Inventors: Wen-Yu Tsai, Taichung (TW); Chien-Pang Chang, Taichung (TW); Chi-Wei Chi, Taichung (TW); Wei-Fong Hong, Taichung (TW); Chun-Hung Teng, Taichung (TW); Kuo-Chiang Chu, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 565 days.

(21) Appl. No.: 17/553,939

(22) Filed: Dec. 17, 2021

(65) Prior Publication Data

US 2022/0196881 A1 Jun. 23, 2022

Related U.S. Application Data

(60) Provisional application No. 63/137,772, filed on Jan. 15, 2021, provisional application No. 63/129,826, filed on Dec. 23, 2020.

(30) Foreign Application Priority Data

Jun. 10, 2021 (TW) ................................. 110121227

(51) Int. Cl.
*G02B 1/11* (2015.01)
*G02B 1/115* (2015.01)
(Continued)

(52) U.S. Cl.
CPC .............. *G02B 1/115* (2013.01); *G02B 1/002* (2013.01); *G02B 3/08* (2013.01); *G02B 13/18* (2013.01)

(58) Field of Classification Search
CPC . G02B 1/00; G02B 1/002; G02B 1/04; G02B 1/041; G02B 1/10; G02B 1/11;
(Continued)

(56) References Cited

U.S. PATENT DOCUMENTS

| 9,488,852 B2 | 11/2016 | Cado et al. |
| 2001/0004300 A1 | 6/2001 | Tanaka et al. |

(Continued)

FOREIGN PATENT DOCUMENTS

| CN | 111201455 A | 5/2020 |
| EP | 2653453 A1 | 10/2013 |

(Continued)

OTHER PUBLICATIONS

Christoffer Kauppinen et al., "Grass-like Alumina with Low Refractive Index for Scalable, Broadband, Omnidirectional Antireflection Coatings on Glass Using Atomic Layer Deposition", ACS Applied Materials & Interfaces, published on Apr. 11, 2017, vol. 9, Issue 17, pp. 15038-15043, published by American Chemical Society, U.S.A.

(Continued)

*Primary Examiner* — Sultan Chowdhury
(74) *Attorney, Agent, or Firm* — McClure, Qualey & Rodack, LLP

(57) ABSTRACT

An optical lens assembly includes, from an object side to an image side, at least four optical lens elements. At least one of the at least four optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflec- (Continued)

tive coating includes a plurality of holes, and sizes of the plurality of holes adjacent to the outer of the anti-reflective coating are larger than sizes of the plurality of holes adjacent to the inner of the anti-reflective coating.

28 Claims, 18 Drawing Sheets

(51) Int. Cl.
    *G02B 1/00*     (2006.01)
    *G02B 3/08*     (2006.01)
    *G02B 13/18*     (2006.01)

(58) Field of Classification Search
    CPC ......... G02B 1/113; G02B 1/115; G02B 1/118; G02B 27/00; G02B 27/0012; G02B 27/0101; G02B 27/0138; G02B 13/00; G02B 13/0015; G02B 13/04; G02B 13/18; G02B 9/00; G02B 9/02; G02B 9/06; G02B 9/34
    See application file for complete search history.

(56) References Cited

U.S. PATENT DOCUMENTS

| | | |
|---|---|---|
| 2005/0233113 A1 | 10/2005 | Kotani et al. |
| 2006/0134433 A1 | 6/2006 | Vaula et al. |
| 2006/0199040 A1 | 9/2006 | Yamada et al. |
| 2008/0102259 A1 | 5/2008 | Nikolov et al. |
| 2009/0022954 A1 | 1/2009 | Kotani et al. |
| 2009/0081361 A1 | 3/2009 | Yamada et al. |
| 2009/0219620 A1 | 9/2009 | Yamada et al. |
| 2010/0119782 A1 | 5/2010 | Ohgane |
| 2010/0220377 A1 | 9/2010 | Yamada et al. |
| 2011/0019277 A1 | 1/2011 | Sager et al. |
| 2011/0069378 A1 | 3/2011 | Lin et al. |
| 2011/0176216 A1 | 7/2011 | Kawauchi et al. |
| 2012/0075688 A1 | 3/2012 | Yamada et al. |
| 2012/0081792 A1 | 4/2012 | Neuffer |
| 2012/0176681 A1 | 7/2012 | Chang et al. |
| 2012/0212827 A1 | 8/2012 | Kakegawa |
| 2012/0275027 A1 | 11/2012 | Okuno |
| 2013/0016430 A1 | 1/2013 | Ogawa et al. |
| 2013/0027779 A1 | 1/2013 | Okuno et al. |
| 2013/0094102 A1* | 4/2013 | Baba ............... G02B 13/0035 359/784 |
| 2013/0140675 A1 | 6/2013 | Chen et al. |
| 2013/0201562 A1 | 8/2013 | Kawagishi et al. |
| 2013/0228942 A1 | 9/2013 | Ohgane |
| 2013/0258480 A1 | 10/2013 | Makino et al. |
| 2013/0260096 A1 | 10/2013 | Shiki et al. |
| 2013/0271842 A1 | 10/2013 | Miyahara et al. |
| 2013/0273317 A1 | 10/2013 | Nakayama |
| 2013/0329295 A1 | 12/2013 | Okuno |
| 2014/0016188 A1 | 1/2014 | Liu |
| 2014/0016189 A1 | 1/2014 | Tamura et al. |
| 2014/0063610 A1 | 3/2014 | Murata et al. |
| 2014/0117397 A1 | 5/2014 | Saeki et al. |
| 2014/0254019 A1 | 9/2014 | Murata et al. |
| 2014/0320968 A1 | 10/2014 | Murata et al. |
| 2014/0320970 A1 | 10/2014 | Kamiyam et al. |
| 2014/0329072 A1 | 11/2014 | Hirasawa et al. |
| 2015/0153484 A1 | 6/2015 | Neuffer |
| 2015/0160377 A1 | 6/2015 | Kuroda et al. |
| 2015/0369967 A1 | 12/2015 | Okuno et al. |
| 2016/0054476 A1 | 2/2016 | Choi et al. |
| 2016/0216409 A1 | 7/2016 | Schulz et al. |
| 2016/0377767 A1 | 12/2016 | Sonoda et al. |
| 2017/0160437 A1 | 6/2017 | Nakayama |
| 2017/0212278 A1 | 7/2017 | Abe |
| 2017/0276839 A1 | 9/2017 | Teramoto |
| 2018/0100957 A1 | 4/2018 | Ye et al. |
| 2018/0194619 A1 | 7/2018 | Greer et al. |
| 2018/0203162 A1 | 7/2018 | Schulz et al. |
| 2019/0016593 A1 | 1/2019 | Greer et al. |
| 2019/0041613 A1 | 2/2019 | Jung |
| 2019/0049737 A1* | 2/2019 | Terai ............... G02B 27/0955 |
| 2019/0196064 A1 | 6/2019 | Nakamura et al. |
| 2020/0073028 A1* | 3/2020 | Shigemitsu ............... G02B 5/04 |
| 2020/0240011 A1 | 7/2020 | Kauppinen et al. |
| 2021/0067713 A1* | 3/2021 | Voelker ............... H04N 23/55 |
| 2021/0294066 A1* | 9/2021 | Hirata ............... H05B 1/0288 |

FOREIGN PATENT DOCUMENTS

| | | |
|---|---|---|
| JP | 2001017907 A | 1/2001 |
| JP | 6414083 B2 | 10/2018 |
| TW | M591177 U | 2/2020 |
| WO | 2010024214 A1 | 3/2010 |
| WO | 2017199249 A1 | 11/2017 |

OTHER PUBLICATIONS

Kirill Isakov et al., "Superhydrophobic Antireflection Coating on Glass Using Grass-like Alumina and Fluoropolymer", ACS Applied Materials & Interfaces, published on Oct. 21, 2020, vol. 12, Issue 44, pp. 49957-49962, published by American Chemical Society, U.S.A.

Takeharu Okuno et al., "The Development of Subwavelength Structure Coating (SWC)", Journal of The Society of Photographic Science and Technology of Japan, published in 2011, vol. 74, Issue 6, pp. 302-307, published by The Society of Photographic Science and Technology of Japan, Japan.

\* cited by examiner

OPTICAL LENS ASSEMBLY, IMAGING APPARATUS AND ELECTRONIC DEVICE

RELATED APPLICATIONS

This application claims priority to U.S. Provisional Application Ser. No. 63/129,826, filed Dec. 23, 2020, U.S. Provisional Application Ser. No. 63/137,772, filed Jan. 15, 2021, and Taiwan Application Serial Number 110121227, filed Jun. 10, 2021, which are herein incorporated by reference.

BACKGROUND

Technical Field

The present disclosure relates to an optical lens assembly and an imaging apparatus. More particularly, the present disclosure relates to an optical lens assembly and an imaging apparatus for preventing reflection.

Description of Related Art

A usable anti-reflective coating only can be manufactured on a planar surface by the conventional coating techniques (PVD and general CVD). In high-end mobile devices, the requirements of lens assemblies with high quality significantly increase, and the number of lens elements in the high-end lens assemblies also significantly increases correspondingly. Due to the growing difficulty in designing the optical systems and the increment of lens elements, the changes of surface shape of the optical lens element adjacent to the image surface greatly increase because the huge aberration of off-axis field need to be corrected, which becomes a bottleneck that cannot be overcome in the conventional coating techniques. Therefore, it is a trend to develop a coating technique for high uniformity in the high-end optical systems with multiple lens elements and on the optical lens elements with extreme surface shape changes.

SUMMARY

According to one aspect of the present disclosure, an optical lens assembly includes, from an object side to an image side, at least four optical lens elements. At least one of the at least four optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: $|Tc-Tp|/Tc \leq 5.00\%$; and $-1.5 \leq FAR$.

According to another aspect of the present disclosure, an imaging apparatus includes an optical lens assembly, a Fresnel lens element and an image sensor. The optical lens assembly includes, from an object side to an image side, at least four optical lens elements. At least one of the at least four optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: $|Tc-Tp|/Tc \leq 5.00\%$; and $-1.5 \leq FAR$. At least one surface of the Fresnel lens element includes an anti-reflective coating, and the anti-reflective coating of the Fresnel lens element is made of aluminum oxide. The image sensor is disposed on an image surface of the optical lens assembly.

According to another aspect of the present disclosure, an imaging apparatus includes an optical lens assembly, a curved lens element and an image sensor. The optical lens assembly includes, from an object side to an image side, at least four optical lens elements. At least one of the at least four optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: $|Tc-Tp|/Tc \leq 5.00\%$; and $-1.5 \leq FAR$. At least one surface of the curved lens element includes a meta lens structure. The image sensor is disposed on an image surface of the optical lens assembly.

According to another aspect of the present disclosure, an electronic device, which is a mobile device, includes the imaging apparatus of the aforementioned aspect.

According to another aspect of the present disclosure, an optical lens assembly includes, from an object side to an image side, at least one optical lens element and at least one anti-reflective element. At least one surface of at least one of the at least one anti-reflective element includes an anti-reflective coating. The at least one anti-reflective element including the anti-reflective coating is made of a glass material. The anti-reflective coating includes at least two coating layers. One of the at least two coating layers closest to a substrate of the at least one anti-reflective element including the anti-reflective coating is a first coating layer, and a refractive index of the first coating layer is smaller than a refractive index of the substrate. One of the at least two coating layers at the outer of the anti-reflective coating is mainly made of aluminum oxide. The anti-reflective coating includes a plurality of holes, and sizes of the plurality of holes adjacent to the outer of the anti-reflective coating are larger than sizes of the plurality of holes adjacent to the inner of the anti-reflective coating. A refractive index of the coating layer at the outermost of the anti-reflective coating is gradient. When a total thickness of coating layers of the anti-reflective coating is tTk, the following condition is satisfied: 200 nm<tTk≤400 nm.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
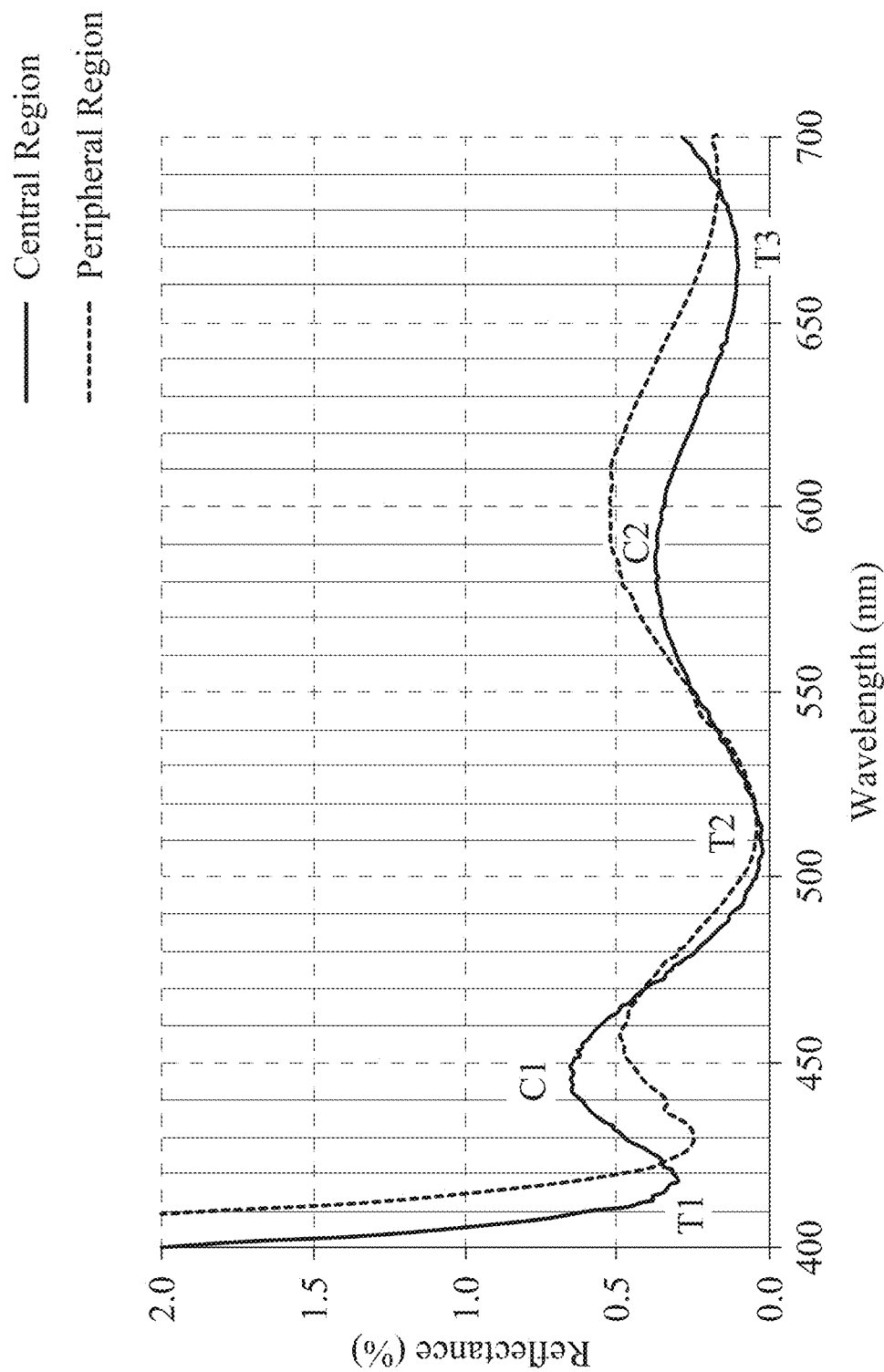
FIG. 1 is a relationship diagram of reflectance and wavelength of the optical lens assembly according to the 1st embodiment.

An optical lens assembly includes, from an object side to an image side, at least four optical lens elements. At least one of the at least four optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer, and one of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: |Tc−Tp|/Tc≤5.00%; and −1.5≤FAR.

The optical lens assembly with several optical lens elements is developed in the present disclosure. The atomic layer deposit coating technique is adopted to design an excellent coating arrangement with specific multiple anti-reflective coating arranging factors. Due to the characteristic of meta lens structure on the surface of the anti-reflective coating, the best anti-reflective effect of the high-quality optical lens assembly with several optical lens elements can be obtained. Thus, the severe reflective problem of strong light at large angle caused by the optical lens elements with extreme surface shape changes can be solved, so as to obtain an even manufacturing result for the anti-reflective coating within the whole field of view of the curved optical lens element. In this regard, when assembling and applying the optical lens element in the optical lens assembly with several optical lens elements, it is favorable for significantly enhancing the image quality of the high-end optical lens assembly.

When the total thickness of the anti-reflective coating at the central region of the at least one optical lens element including the anti-reflective coating is Tc, and the total thickness of the anti-reflective coating at the peripheral region of the at least one optical lens element including the anti-reflective coating is Tp, the following conditions can be satisfied: $|Tc-Tp|/Tc \le 10.00\%$; $|Tc-Tp|/Tc \le 3.00\%$; $|Tc-Tp|/Tc \le 1.50\%$; or $0\% < |Tc-Tp|/Tc \le 0.50\%$.

When a first anti-reflective coating arranging factor of the optical lens assembly is Far1, a second anti-reflective coating arranging factor of the optical lens assembly is Far2, a third anti-reflective coating arranging factor of the optical lens assembly is Far3, and the major anti-reflective coating arranging factor of the optical lens assembly is FAR, where FAR=LOG(Far1×Far2×Far3), the following conditions can be satisfied: $-1.0 \le FAR$; $-0.75 \le FAR$; $-0.50 \le FAR$; $-0.30 \le FAR \le 1$; or $0.1 \le FAR \le 10$.

The optical lens assembly with several optical lens elements is developed in the present disclosure. The atomic layer deposit coating technique can be adopted to design an excellent coating arrangement with specific multiple anti-reflective coating arranging factors. Due to the characteristic of meta lens structure on the surface of the anti-reflective coating, the best anti-reflective effect of the high-quality optical lens assembly with several optical lens elements can be obtained. Thus, the severe reflective problem of strong light at large angle caused by the optical lens elements with extreme surface shape changes can be solved, so as to obtain an even manufacturing result for the anti-reflective coating within the whole field of view of the curved optical lens element. In this regard, when assembling and applying the optical lens element in the optical lens assembly with several optical lens elements, it is favorable for significantly enhancing the image quality of the high-end optical lens assembly.

The at least one optical lens element including the anti-reflective coating can be a substrate. When a central thickness of the substrate is CTs, a maximum of displacements in parallel with an optical axis from a surface of the at least one optical lens element including the anti-reflective coating to an axial vertex of the at least one optical lens element including the anti-reflective coating is SAGmax, and the first anti-reflective coating arranging factor of the optical lens assembly is Far1, where Far1=|SAGmax|/CTs, the following condition can be satisfied: $0.500 \le Far1$. By controlling the changing correlation factors of the thicknesses and displacements in parallel with the optical axis in off-axis regions of the optical lens elements of the optical lens assembly, the best coating arrangement of the optical lens assembly can be effectively obtained. Moreover, the following conditions can be satisfied: $1.000 \le Far1$; $1.500 \le Far1$; $1.700 \le Far1$; or $2.000 \le Far1$.

When an average of tangent slopes in an optical effective diameter region of a surface of the at least one optical lens element including the anti-reflective coating is SPavg, a minimum of the tangent slopes in the optical effective diameter region of the surface of the at least one optical lens element including the anti-reflective coating is SPmin, and the second anti-reflective coating arranging factor of the optical lens assembly is Far2, where Far2=1/(|SPavg|×|SPmin|), the following condition can be satisfied: $0.100 \le Far2$. By controlling the surface-changing factors in the off-axis regions of the optical lens elements of the optical lens assembly, the best coating arrangement of the optical lens assembly can be effectively obtained and the value of applications of the anti-reflective coating can be enhanced. Moreover, the following conditions can be satisfied: $0.200 \le Far2$; $0.300 \le Far2$; $0.400 \le Far2$; or $0.500 \le Far2$.

When a refractive index of the substrate is Ns, and the third anti-reflective coating arranging factor of the optical lens assembly is Far3, where Far3=$(1/(Ns-1))^2$, the following condition can be satisfied: $2.5 \le Far3$. By controlling the deviation factors between the refractive indices of the optical lens elements and the air, the anti-reflective coating can be arranged on the most suitable surface of the optical lens elements in the optical lens assembly. The light can pass the coating layer of the anti-reflective coating from the air into the optical lens elements in a way of gradually changing the refractive index thereof, so as to perform the best anti-reflective effect and reach the desired anti-reflective result. Moreover, the following conditions can be satisfied: $2.9 \le Far3$; $3.0 \le Far3$; $3.1 \le Far3$; $3.3 \le Far3$; or $3.5 \le Far3$.

When the refractive index of the substrate is Ns, the following condition can be satisfied: $Ns \le 1.7682$. By applying the coating technique to the low-refractive materials whose refractive index is close to the refractive index of air, the anti-reflective effect of the anti-reflective coating can be effectively enhanced and the effect of reducing the reflectance can be improved. Moreover, the following conditions can be satisfied: $Ns \le 1.700$; or $Ns \le 1.600$.

The coating layer at the inner of the anti-reflective coating can be made of aluminum oxide ($Al_2O_3$). With proper arrangement of the material of the optical lens elements and the material of the coating layer of the anti-reflective coating in contact with the optical lens elements, better coating adhesion and protection of the surface of the optical lens elements can be obtained. Thus, it prevents the anti-reflective coating from peeling off due to insufficient adhesion and avoids the surface defect of the optical lens elements caused by the coating process, which is favorable for increasing the passing rate of the optical lens elements in the environmental weather resistance test.

The anti-reflective coating can include at least three coating layers, and the at least three coating layers can be made of different materials. With the protective coating layers which are resistant to scratching and rubbing or are able to protect the optical lens elements, it can prevent the anti-reflective coating from breaking and chemical corrosion.

When a wavelength with relatively low reflectance in a range (±25 nm) of a reflectance trough at the central region of the at least one optical lens element including the anti-reflective coating is Wtc, and a wavelength with relatively low reflectance in a range (±25 nm) of a reflectance trough at the peripheral region of the at least one optical lens element including the anti-reflective coating is Wtp, the following condition can be satisfied: $0 \text{ nm} \le |Wtc-Wtp| \le 25 \text{ nm}$. By controlling the reflectance offset in a specific range of wavelength at the reflectance trough, it can maintain the uniform anti-reflective effect in the effective diameter region of the optical lens element. Moreover, the following conditions can be satisfied: $0 \text{ nm} < |Wtc-Wtp| \le 15 \text{ nm}$; or $1 \text{ nm} \le |Wtc-Wtp| \le 10 \text{ nm}$.

When a relatively low reflectance in the range (±25 nm) of the reflectance trough at the central region of the at least one optical lens element including the anti-reflective coating is Rtc, the following condition can be satisfied: $0\% < Rtc \le 0.300\%$. By reducing the reflectance of the reflectance trough at the central region of the optical lens element, it is favorable for improving the best anti-reflective effect of the anti-reflective coating in the specific range of wavelength. Moreover, the following conditions can be satisfied: Rtc≤0.200%; or Rtc≤0.100%.

When a relatively low reflectance in the range (±25 nm) of the reflectance trough at the peripheral region of the at least one optical lens element including the anti-reflective coating is Rtp, the following condition can be satisfied: 0%<Rtp≤0.300%. By reducing the reflectance of the reflectance trough at the peripheral region of the optical lens element, it is favorable for improving the best anti-reflective effect of the anti-reflective coating in the specific range of wavelength. Moreover, the following conditions can be satisfied: Rtp≤0.200%; or Rtp≤0.100%.

When a wavelength with relatively high reflectance in a range (±25 nm) of a reflectance crest at the central region of the at least one optical lens element including the anti-reflective coating is Wcc, and a wavelength with relatively high reflectance in a range (±25 nm) of a reflectance crest at the peripheral region of the at least one optical lens element including the anti-reflective coating is Wcp, the following condition can be satisfied: 0 nm≤|Wcc−Wcp|≤20 nm. By controlling the reflectance offset in a specific range of wavelength at the reflectance crest, it can maintain the uniform anti-reflective effect in the effective diameter region of the optical lens element. Moreover, the following conditions can be satisfied: 0 nm≤|Wcc−Wcp|≤25 nm, 0 nm<|Wcc−Wcp|≤15 nm, or 1 nm≤|Wcc−Wcp|≤10 nm.

When a relatively high reflectance in the range (±25 nm) of the reflectance crest at the central region of the at least one optical lens element including the anti-reflective coating is Rcc, the following condition can be satisfied: 0.200%≤Rcc≤0.700%. By reducing the reflectance of the reflectance crest at the central region of the optical lens element, it is favorable for improving the best anti-reflective effect of the anti-reflective coating in the specific range of wavelength. Moreover, the following conditions can be satisfied: 0.300%≤Rcc≤0.600%; or 0.400%≤Rcc≤0.500%.

When a relatively high reflectance in the range (±25 nm) of the reflectance crest at the peripheral region of the at least one optical lens element including the anti-reflective coating is Rcp, the following condition can be satisfied: 0.200%≤Rcp≤0.700%. By reducing the reflectance of the reflectance crest at the peripheral region of the optical lens element, it is favorable for improving the best anti-reflective effect of the anti-reflective coating in the specific range of wavelength. Moreover, the following conditions can be satisfied: 0.300%≤Rcp≤0.600%; or 0.400%≤Rcp≤0.500%.

At least one surface of the at least one optical lens element including the anti-reflective coating can include at least one inflection point. With the design of inflection point on the surface of the optical lens element, it is favorable for providing the cost benefit of the atomic layer deposit coating. The uniform coating result on the surface of the optical lens element with extreme surface shape changes can be achieved, and a defect of strong reflective light at the peripheral region of the optical lens element due to the reflectance offset, which is caused by the difference between the layer thicknesses of the anti-reflective coating, can be avoided.

When a total number of coating layers of the anti-reflective coating is tLs, the following condition can be satisfied: 1≤tLs≤8. By controlling the number of coating layers of the anti-reflective coating, the manufacturing efficiency can be enhanced and the cost can be reduced.

When a total thickness of coating layers of the anti-reflective coating is tTk, the following condition can be satisfied: 200 nm<tTk≤400 nm. By controlling the total thickness of the anti-reflective coating, the best low-reflective effect can be maintained. Moreover, the following conditions can be satisfied: 150 nm≤tTk≤800 nm; 200 nm≤tTk≤600 nm; 230 nm≤tTk≤500 nm; or 240 nm≤tTk≤400 nm.

When a field of view of the optical lens assembly is FOV, the following conditions can be satisfied: 60 degrees≤FOV≤220 degrees; or 70 degrees≤FOV≤100 degrees. By applying the anti-reflective coating to the optical lens assemblies for different conditions based on the requirements, so as to obtain the desired anti-reflective effect.

When a total thickness of the anti-reflective coating at the central region of the at least one optical lens element including the anti-reflective coating is Tc, the following conditions can be satisfied: 150 nm≤Tc≤800 nm; 200 nm≤Tc≤600 nm; 230 nm≤Tc≤500 nm; or 240 nm≤Tc≤400 nm.

When a total thickness of the anti-reflective coating at the peripheral region of the at least one optical lens element including the anti-reflective coating is Tp, the following conditions can be satisfied: 150 nm≤Tp≤800 nm; 200 nm≤Tp≤600 nm; 230 nm≤Tp≤500 nm; or 240 nm≤Tp≤400 nm.

An optical lens assembly includes, from an object side to an image side, at least one optical lens element and at least one anti-reflective element. At least one surface of at least one of the at least one anti-reflective element includes an anti-reflective coating. The at least one anti-reflective element including the anti-reflective coating is made of a glass material. The anti-reflective coating includes at least two coating layers. One of the at least two coating layers closest to a substrate of the at least one anti-reflective element including the anti-reflective coating is a first coating layer, and a refractive index of the first coating layer is smaller than a refractive index of the substrate. One of the at least two coating layers at the outer of the anti-reflective coating is mainly made of aluminum oxide. The anti-reflective coating includes a plurality of holes. Sizes of the plurality of holes adjacent to the outer of the anti-reflective coating are larger than sizes of the plurality of holes adjacent to the inner of the anti-reflective coating. A refractive index of the coating layer at the outermost of the anti-reflective coating is gradient. When a total thickness of coating layers of the anti-reflective coating is tTk, the following condition is satisfied: 200 nm<tTk≤400 nm.

The optical lens assembly is developed in the present disclosure. The coating technique and specific anti-reflective coating arranging factor are adopted for designing. Due to the characteristic of meta lens structure on the surface of the anti-reflective coating, the best anti-reflective effect of the optical lens assembly with anti-reflective element can be obtained. Thus, the severe reflective problem of strong light at large angle can be solved, so as to obtain an even manufacturing result for the anti-reflective coating.

The substrate can be a planar lens element. When a central thickness of the substrate is CTs, the following condition can be satisfied: 0.15 mm<CTs≤0.60 mm, so as to improve the product yield by adjusting the substrate characteristic properly. Moreover, the following conditions can be satisfied: 0.15 mm≤CTs≤2.00 mm, CTs≤1.50 mm; CTs≤1.00 mm; CTs≤0.60 mm; CTs≤0.45 mm, or CTs≤0.35 mm.

When a third anti-reflective coating arranging factor of the optical lens assembly is Far3, the following condition can be satisfied: 1.0≤Far3≤5.0. By controlling the deviation factors between the refractive indices of the substrate and the air, the refractive index of the light becomes gradually changeable from the air, so as to perform the best anti-reflective effect and reach the desired anti-reflective result. Moreover, the following conditions can be satisfied: $1.4 \leq Far3 \leq 4.0$; or $1.6 \leq Far3 \leq 3.6$.

When an average reflectance between a wavelength of 400 nm-630 nm of the substrate is R4063, the following condition can be satisfied: $0\% \leq R4063 \leq 1.3\%$, so as to reach the desired anti-reflective result by controlling the reflective performance. Moreover, the following conditions can be satisfied: $R4063 \leq 1.0\%$; $R4063 \leq 0.7\%$; or $R4063 \leq 0.5\%$.

When an average reflectance between a wavelength of 670 nm-1000 nm of the substrate is R67100, the following condition can be satisfied: $0\% \leq R67100 \leq 3.0\%$, so as to reach the desired anti-reflective result by controlling the reflective performance. Moreover, the following conditions can be satisfied: $R67100 \leq 2.5\%$; $R67100 \leq 2.0\%$; or $R67100 \leq 1.5\%$.

When an average transmittance between a wavelength of 400 nm-600 nm of the substrate is T4060, the following condition can be satisfied: $95\% \leq T4060 \leq 100\%$, so as to reach the desired light-transmitting result by controlling the transmitting performance. Moreover, the following conditions can be satisfied: $97\% \leq T4060$; or $99\% \leq T4060$.

The anti-reflective coating can include a second coating layer. A refractive index of the second coating layer can be larger than the refractive index of the first coating layer, the refractive index of the second coating layer can be larger than the refractive index of the substrate, and the refractive index of the coating layer at the outermost of the anti-reflective coating is equivalently smaller than the refractive indices of the first coating layer and the substrate. Thus, the anti-reflective effect can be effectively enhanced.

The substrate can be a micro lens, which is favorable for reducing the stray lights with petal shapes.

When the refractive index of the substrate is Ns, the following conditions can be satisfied: $1.40 \leq Ns \leq 2.00$; $1.45 \leq Ns \leq 1.90$; $1.50 \leq Ns \leq 1.80$; or $1.50 \leq Ns \leq 1.75$.

When a wavelength of a minimum reflectance between a wavelength of 400 nm-1000 nm of the substrate is WRmin, the following conditions can be satisfied: $550\ nm \leq WRmin \leq 600\ nm$; $560\ nm \leq WRmin \leq 595\ nm$; or $570\ nm \leq WRmin$.

When an average reflectance between a wavelength of 400 nm-600 nm of the substrate is R4060, the following conditions can be satisfied: $0\% \leq R4060 \leq 1.3\%$; $R4060 \leq 1.0\%$; $R4060 \leq 0.7\%$; or $R4060 \leq 0.5\%$.

When an average reflectance between a wavelength of 400 nm-650 nm of the substrate is R4065, the following conditions can be satisfied: $0\% \leq R4065 \leq 1.3\%$; $R4065 \leq 1.0\%$; $R4065 \leq 0.7\%$; or $R4065 \leq 0.5\%$.

When an average reflectance between a wavelength of 400 nm-1000 nm of the substrate is R40100, the following conditions can be satisfied: $0\% \leq R40100 \leq 2.5\%$; $R40100 \leq 2.0\%$; $R40100 \leq 1.5\%$; or $R40100 \leq 1.0\%$.

When an average reflectance between a wavelength of 500 nm-600 nm of the substrate is R5060, the following conditions can be satisfied: $0\% \leq R5060 \leq 1.3\%$; $R5060 \leq 1.0\%$; $R5060 \leq 0.7\%$; or $R5060 \leq 0.5\%$.

When an average reflectance between a wavelength of 600 nm-700 nm of the substrate is R6070, the following conditions can be satisfied: $0\% \leq R6070 \leq 2.5\%$; $R6070 \leq 2.0\%$; $R6070 \leq 1.5\%$; or $R6070 \leq 1.0\%$.

When an average reflectance between a wavelength of 700 nm-1000 nm of the substrate is R70100, the following conditions can be satisfied: $0\% \leq R70100 \leq 3.0\%$; $R70100 \leq 2.5\%$; $R70100 \leq 2.0\%$; or $R70100 \leq 1.5\%$.

When an average reflectance between a wavelength of 800 nm-1000 nm of the substrate is R80100, the following conditions can be satisfied: $0\% \leq R80100 \leq 3.0\%$; $R80100 \leq 2.5\%$; $R80100 \leq 2.0\%$; or $R80100 \leq 1.5\%$.

When an average reflectance between a wavelength of 900 nm-1000 nm of the substrate is R90100, the following conditions can be satisfied: $0\% \leq R90100 \leq 3.0\%$; $R90100 \leq 2.5\%$; $R90100 \leq 2.0\%$; or $R90100 \leq 1.5\%$.

When a reflectance at a wavelength of 500 nm of the substrate is R50, the following conditions can be satisfied: $0\% \leq R50 \leq 1.3\%$; $R50 \leq 1.0\%$; $R50 \leq 0.7\%$; or $R50 \leq 0.5\%$.

When a reflectance at a wavelength of 600 nm of the substrate is R60, the following conditions can be satisfied: $0\% \leq R60 \leq 1.3\%$; $R60 \leq 1.0\%$; $R60 \leq 0.7\%$; or $R60 \leq 0.5\%$.

When a reflectance at a wavelength of 650 nm of the substrate is R65, the following conditions can be satisfied: $0\% \leq R65 \leq 1.3\%$; $R65 \leq 1.0\%$; $R65 \leq 0.7\%$; or $R65 \leq 0.5\%$.

When a reflectance at a wavelength of 700 nm of the substrate is R70, the following conditions can be satisfied: $0\% \leq R70 \leq 2.5\%$; $R70 \leq 2.0\%$; $R70 \leq 1.5\%$; or $R70 \leq 1.0\%$.

When a reflectance at a wavelength of 800 nm of the substrate is R80, the following conditions can be satisfied: $0\% \leq R80 \leq 3.0\%$; $R80 \leq 2.5\%$; $R80 \leq 2.0\%$; or $R80 \leq 1.5\%$.

When a reflectance at a wavelength of 900 nm of the substrate is R90, the following conditions can be satisfied: $0\% \leq R90 \leq 3.0\%$; $R90 \leq 2.5\%$; $R90 \leq 2.0\%$; or $R90 \leq 1.5\%$.

When a reflectance at a wavelength of 1000 nm of the substrate is R100, the following conditions can be satisfied: $0\% \leq R100 \leq 3.0\%$; $R100 \leq 2.5\%$; $R100 \leq 2.0\%$; or $R100 \leq 1.5\%$.

When a wavelength of a maximum transmittance between a wavelength of 400 nm-1000 nm of the substrate is Tmax, the following conditions can be satisfied: $98\% < Tmax \leq 100\%$; or $99\% \leq Tmax$.

When an average transmittance between a wavelength of 500 nm-600 nm of the substrate is T5060, the following conditions can be satisfied: $98\% < T5060 \leq 100\%$; or $99\% \leq T5060$.

When a transmittance at a wavelength of 400 nm of the substrate is T40, the following conditions can be satisfied: $85\% \leq T40 \leq 100\%$; $90\% \leq T40$; or $92\% \leq T40$.

When a transmittance at a wavelength of 500 nm of the substrate is T50, the following condition can be satisfied: $98\% < T50 \leq 100\%$.

When a transmittance at a wavelength of 600 nm of the substrate is T60, the following condition can be satisfied: $98\% < T60 \leq 100\%$.

When a transmittance at a wavelength of 700 nm of the substrate is T70, the following conditions can be satisfied: $T70 \leq 0.2\%$; or $T70 \leq 0.15\%$.

The optical lens assembly with excellent quality is provided in the present disclosure, and the best design thereof is made after the comprehensive evaluation of the parameters, such as the anti-reflective coating arranging factors. The anti-reflective coating is disposed on the specific surface of the plastic optical lens element, so as to obtain excellent uniformity, high environmental weather resistance, best anti-reflective effect and great imaging quality of the anti-reflective coating.

It is the most preferable that the optical lens element include the anti-reflective coatings on the both surfaces thereof, but the anti-reflective coating can also be manufactured only on one suitable surface thereof. By adopting the technique of the present disclosure to the surfaces of the optical lens elements with extreme surface shape changes, the anti-reflective coatings manufactured by the atomic layer deposit coating technique will have optimal values. The balance between the cost and the quality can be achieved. Also, by manufacturing the anti-reflective coatings on the optical lens elements having the most suitable reflectance, the best anti-reflective effect can be obtained.

The reflectance in the present disclosure is measured on a single optical lens element or a substrate, and the data of the light with the incident angle of 0 degrees is chosen to be the basis for the comparison of reflectance.

The pore distribution on the surface of the optical lens element can be effectively improved by the surface pore-forming process. Therefore, the distance between the pores on the surface of the optical lens element can increase, the pore structure can be sponge-like or the density of pores can be changed. The pore-forming effect can also change along the depth of the anti-reflective coating. For example, the outer side of the anti-reflective coating in contact with the air has a larger pore structure, while the inner side thereof has a relatively smaller pore structure. It is obvious that the pores/notches at the outer side are relatively larger than those at the inner side, which also means that the irregular branch-like structure distributes with a lower density at the outer side of a plane, and the irregular branch-like structure distributes with a higher density at the inner side of the same plane. The aforementioned pores are made of the spaces between the irregular nanofiber structures. The air can stay or communicate between the pores, which makes the coating layer at the outermost have a gradient refractive index. The outer side and inner side of the anti-reflective coating are that, in the sectional views and schematic views, the outer side is the side of the anti-reflective coating exposed to the air, and the inner side is the side of the anti-reflective coating closer to the optical lens element or the substrate. The surface pore-forming process can be achieved by plasma etching, chemical etching, controlling crystalline size with time, or high temperature solution treatment, such as immersion in alcohol or water over 50 degrees.

The material of the coating layer at the outer of the anti-reflective coating of the present disclosure can be metal oxides, metal nitrides, metal fluorides, non-metal oxides, non-metal nitrides, non-metal fluorides or ceramics. The main composition of ceramics is oxides, nitrides, borides and carbides, such as aluminum oxide. When the material of the coating layer at the outer of the anti-reflective coating is $SiO_2$, $Nb_2O_5$, $Pa_2O_5$ or $MgF_2$, the coating layer can be manufactured by physical vapor deposition (PVD), dry etching with argon ions (Ar) or wet etching with phosphoric acid solution, and different nanofiber structures can also be produced. The nanofiber structures can be pillar-like, strip-like, cone-like, tower-like, petal-like or irregular. The thickness of the nanofiber structures is about 100 nm-300 nm, and the diameter of the nanofibers is about 10 nm-100 nm.

A refractive index at a wavelength of 587.6 nm of a high refractive index material of the anti-reflective coatings is Nh, and a refractive index at a wavelength of 587.6 nm of a low refractive index material of the anti-reflective coatings is Nl. The refractive index of the high refractive index material of the anti-reflective coatings can be greater than 2.0, and the refractive index of the low refractive index material of the anti-reflective coatings can be smaller than 1.8. For example, the materials of the anti-reflective coatings (refractive index at the wavelength of 587.6 nm) can be: $MgF_2$ (1.3777), $SiO_2$ (1.4585), $Al_2O_3$ (1.7682), $HfO_2$ (1.8935), ZnO (1.9269), $Sc_2O_3$ (1.9872), AlN (2.0294), $Si_3N_4$ (2.0381), $Ta_2O_5$ (2.1306), $ZrO_2$ (2.1588), ZnS (2.2719), $Nb_2O_5$ (2.3403), $TiO_2$ (2.6142) or TiN (3.1307).

The material of the first coating layer closest to the surface of the plastic optical lens element can be $TiO_2$, AlN, $Al_2O_3$, aluminum hydroxide ($Al(OH)_3$) or mixtures with aluminum, so as to enhance the adhesion between the anti-reflective coating and the optical lens element and prevent the anti-reflective coating from peeling off. Thus, the protection of the surface of the optical lens element can be obtained and the environmental weather resistance of the optical lens element is effectively improved.

The anti-reflective coating is based on destructive interference, and a single coating layer or a plurality of coating layers can be coated on the surface of the plastic optical lens element. Physical vapor deposition (PVD) can be adopted, such as evaporative deposition or sputtering deposition, or chemical vapor deposition (CVD) can be adopted, such as ultra-high vacuum chemical vapor deposition, microwave plasma-enhanced chemical vapor deposition, plasma-enhanced chemical vapor deposition or atomic layer deposition.

The field of view of the present disclosure is from the central field of view (0 Field) to the field of view of maximum image height (1.0 Field). The field of view covers the optical effective region on the surface of the optical lens element.

The tangent slopes of the surfaces of the optical lens elements are calculated as the optical axis being horizontal, and the tangent slopes in a paraxial region thereof are infinity (INF, $\infty$).

The optical lens assembly can further include a Fresnel lens element, a planar lens element, such as an IR-cut filter, a blue glass, a short-wavelength absorbing element, a long-wavelength absorbing element or a cover glass, a micro lens disposed on a surface of a sensor or on an image surface, or a light-guiding element, which is a filtering element such as a mirror, a prism, a fly-eye integrator. At least one surface of the anti-reflective element can include the anti-reflective coating, and the main materials of different coating layers of the anti-reflective coating can be aluminum oxide, silicon oxides or titanium oxides.

The optical lens assembly can further include a planar lens element or a curved lens element. The planar lens element or the curved lens element is disposed within the optical lens element group or beyond the optical lens element group. The surfaces of the planar lens element or the curved lens element can include a meta lens structure, and the meta lens structure can include the coating layers consisting of metal oxides (such as $TiO_2$, $Al_2O_3$), metal nitrides (such as AlN), silicon oxides (such as $SiO_2$) or silicon nitrides (such as SiN). A graphene coating layer can be arranged on the surface of the optical lens element in the optical lens assembly, so as to obtain the same effect as the meta lens structure.

Thickness and high temperature will make the error of the surface shape change of the plastic optical lens elements become too large. When the number of coating layers of the anti-reflective coating increases, the effect of temperature on the surface shape accuracy is more obvious. The lens correcting technology can effectively solve the temperature effect problem as coating the surface of the plastic optical lens elements, which is favorable for maintaining the integrity of the coating on the optical lens elements and the high precision of the plastic optical lens elements, so as to obtain an imaging lens assembly with high quality.

The lens correcting technology uses methods such as moldflow analysis method, curve fitting function method or wavefront aberration method, which is not limited thereto. The moldflow analysis method uses moldflow analysis to find out the three-dimensional contour nodes of the surface of the optical lens element which contracts on the Z axis. The three-dimensional contour nodes are converted into an aspherical curve to be compared with the original curve. At the same time, the correction value is calculated by considering the shrinkage rate of the material of the optical lens element and the deformation trend of surface shape. The curve fitting function method is to measure the contour deviation of the surface of the optical lens element, and the fitting curve approaches to the measuring point to obtain the correction value by curve-fitting with a function and then by an optimization algorithm. The function can be exponential or polynomial, and the optimization algorithm can be Gauss Newton algorithm, simplex algorithm or steepest descent method. The wavefront aberration method is to measure the wavefront aberration (imaging aberration) data of the optical lens assembly with an interferometer. The wavefront aberration generated during manufacturing and assembling is comprehensively analyzed with the wavefront aberration of the original design value, and the correction value is obtained after optimized with optical software.

An imaging apparatus includes the aforementioned optical lens assembly, a Fresnel lens element and an image sensor. At least one surface of the Fresnel lens element includes an anti-reflective coating, and the anti-reflective coating of the Fresnel lens element is made of aluminum oxide. The image sensor is disposed on an image surface of the optical lens assembly. By manufacturing the anti-reflective coating of aluminum oxide on the Fresnel lens element, the problem of high reflectance at the region where the surface shape of the Fresnel lens element inflects can be solved.

Another imaging apparatus includes the aforementioned optical lens assembly, a curved lens element and an image sensor. At least one surface of the curved lens element includes a meta lens structure. The image sensor is disposed on an image surface of the optical lens assembly. By arranging the curved lens element with the meta lens structure, the number of the optical lens elements can be significantly reduced, and the total track length of the optical lens assembly can effectively decrease to achieve excellent miniaturization of the optical lens assembly.

An electronic device, which is a mobile device, includes the aforementioned imaging apparatus.

According to the above description of the present disclosure, the following specific embodiments are provided for further explanation.

1st Embodiment

The optical lens assembly according to the 1st embodiment includes four optical lens elements, which are, from an object side to an image side, an optical lens element L1, an optical lens element L2, an optical lens element L3 and an optical lens element L4. At least one of the four optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: |Tc−Tp|/Tc≤5.00%; and −1.5≤FAR.

When a refractive index of the material of the optical lens element L1 is Ns, the following condition is satisfied: Ns=1.54. When the third anti-reflective coating arranging factor of the optical lens element L1 is Far3, the following condition is satisfied: Far3=3.38.

An object-side surface of the optical lens element L1 is R1. When the major anti-reflective coating arranging factor of the object-side surface R1 of the optical lens element L1 is FAR, the following condition is satisfied: FAR=−0.610. When the first anti-reflective coating arranging factor of the object-side surface R1 of the optical lens element L1 is Far1, the following condition is satisfied: Far1=0.465. When a second anti-reflective coating arranging factor of the object-side surface R1 of the optical lens element L1 is Far2, the following condition is satisfied: Far2=0.156.

An image-side surface of the optical lens element L1 is R2. When the major anti-reflective coating arranging factor of the image-side surface R2 of the optical lens element L1 is FAR, the following condition is satisfied: FAR=−2.931. When the first anti-reflective coating arranging factor of the image-side surface R2 of the optical lens element L1 is Far1 the following condition is satisfied: Far1=0.057. When a second anti-reflective coating arranging factor of the image-side surface R2 of the optical lens element L1 is Far2, the following condition is satisfied: Far2=0.006.

When a refractive index of the material of the optical lens element L2 is Ns, the following condition is satisfied: Ns=1.63. When the third anti-reflective coating arranging factor of the optical lens element L2 is Far3, the following condition is satisfied: Far3=2.50.

An object-side surface of the optical lens element L2 is R1. When the major anti-reflective coating arranging factor of the object-side surface R1 of the optical lens element L2 is FAR, the following condition is satisfied: FAR=−4.577. When the first anti-reflective coating arranging factor of the object-side surface R1 of the optical lens element L2 is Far1, the following condition is satisfied: Far1=0.013. When a second anti-reflective coating arranging factor of the object-side surface R1 of the optical lens element L2 is Far2, the following condition is satisfied: Far2=0.001.

An image-side surface of the optical lens element L2 is R2. When the major anti-reflective coating arranging factor of the image-side surface R2 of the optical lens element L2 is FAR, the following condition is satisfied: FAR=−1.052. When the first anti-reflective coating arranging factor of the image-side surface R2 of the optical lens element L2 is Far1 the following condition is satisfied: Far1=0.413. When a second anti-reflective coating arranging factor of the image-side surface R2 of the optical lens element L2 is Far2, the following condition is satisfied: Far2=0.086.

When a refractive index of the material of the optical lens element L3 is Ns, the following condition is satisfied: Ns=1.54. When the third anti-reflective coating arranging factor of the optical lens element L3 is Far3, the following condition is satisfied: Far3=3.38.

An object-side surface of the optical lens element L3 is R1. When the major anti-reflective coating arranging factor of the object-side surface R1 of the optical lens element L3 is FAR, the following condition is satisfied: FAR=−0.097. When the first anti-reflective coating arranging factor of the object-side surface R1 of the optical lens element L3 is Far1, the following condition is satisfied: Far1=0.547. When a second anti-reflective coating arranging factor of the object-side surface R1 of the optical lens element L3 is Far2, the following condition is satisfied: Far2=0.433.

An image-side surface of the optical lens element L3 is R2. When the major anti-reflective coating arranging factor of the image-side surface R2 of the optical lens element L3 is FAR, the following condition is satisfied: FAR=0.447. When the first anti-reflective coating arranging factor of the image-side surface R2 of the optical lens element L3 is Far1 the following condition is satisfied: Far1=1.076. When a second anti-reflective coating arranging factor of the image-side surface R2 of the optical lens element L3 is Far2, the following condition is satisfied: Far2=0.770.

When a refractive index of the material of the optical lens element L4 is Ns, the following condition is satisfied: Ns=1.53. When the third anti-reflective coating arranging factor of the optical lens element L4 is Far3, the following condition is satisfied: Far3=3.56.

An object-side surface of the optical lens element L4 is R1. When the major anti-reflective coating arranging factor of the object-side surface R1 of the optical lens element L4 is FAR, the following condition is satisfied: FAR=−0.460. When the first anti-reflective coating arranging factor of the object-side surface R1 of the optical lens element L4 is Far1, the following condition is satisfied: Far1=0.986. When a second anti-reflective coating arranging factor of the object-side surface R1 of the optical lens element L4 is Far2, the following condition is satisfied: Far2=0.099.

An image-side surface of the optical lens element L4 is R2. When the major anti-reflective coating arranging factor of the image-side surface R2 of the optical lens element L4 is FAR, the following condition is satisfied: FAR=0.363. When the first anti-reflective coating arranging factor of the image-side surface R2 of the optical lens element L4 is Far1 the following condition is satisfied: Far1=1.125. When a second anti-reflective coating arranging factor of the image-side surface R2 of the optical lens element L4 is Far2, the following condition is satisfied: Far2=0.575.

Please refer to FIG. 1. FIG. 1 is a relationship diagram of reflectance and wavelength of the optical lens assembly according to the 1st embodiment. The parameter values of each of the optical lens elements in the optical lens assembly according to the 1st embodiment are shown in Table 1 below.

TABLE 1

Optical Lens Assembly of 1st Embodiment
FOV (degrees) 66.97

|  |  | L1 | L2 | L3 | L4 |
|---|---|---|---|---|---|
| CTs |  | 0.61 | 0.30 | 0.80 | 0.40 |
| Ns (at wavelength of 587.6 nm) |  | 1.54 | 1.63 | 1.54 | 1.53 |
| Far3 = $(1/(Ns - 1))^2$ |  | 3.38 | 2.50 | 3.38 | 3.56 |
| R1 | \|SAGmax\| | 0.28 | 0.00 | 0.44 | 0.39 |
|  | Far1 = \|SAGmax\|/CTs | 0.465 | 0.013 | 0.547 | 0.986 |
|  | \|SPmin\| | 1.95 | 15.87 | 1.02 | 2.15 |
|  | \|SPavg\| | 3.28 | 76.92 | 2.27 | 4.72 |
|  | Far2 = 1/(\|SPavg\| × \|SPmin\|) | 0.156 | 0.001 | 0.433 | 0.099 |
|  | FAR = LOG(Far1 × Far2 × Far3) | −0.610 | −4.577 | −0.097 | −0.460 |
| R2 | \|SAGmax\| | 0.03 | 0.12 | 0.86 | 0.45 |
|  | Far1 = \|SAGmax\|/CTs | 0.057 | 0.413 | 1.076 | 1.125 |
|  | \|SPmin\| | 7.35 | 1.98 | 0.86 | 0.56 |
|  | \|SPavg\| | 22.22 | 5.88 | 1.50 | 3.12 |
|  | Far2 = 1/(\|SPavg\| × \|SPmin\|) | 0.006 | 0.086 | 0.770 | 0.575 |

TABLE 1-continued

Optical Lens Assembly of 1st Embodiment
FOV (degrees) 66.97

|  | L1 | L2 | L3 | L4 |
|---|---|---|---|---|
| FAR = LOG(Far1 × Far2 × Far3) | −2.931 | −1.052 | 0.447 | 0.363 |

A central thickness of each of the substrates is CTs, a maximum of displacements in parallel with an optical axis from a surface of each of the optical lens elements to an axial vertex thereof is SAGmax, an average of tangent slopes in an optical effective diameter region of a surface of each of the optical lens elements is SPavg, and a minimum of the tangent slopes in the optical effective diameter region of the surface of each of the optical lens elements is SPmin.

2nd Embodiment

The optical lens assembly according to the 2nd embodiment includes five optical lens elements, which are, from an object side to an image side, an optical lens element L1, an optical lens element L2, an optical lens element L3, an optical lens element L4 and an optical lens element L5. At least one of the five optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: |Tc−Tp|/Tc≤5.00%; and −1.5≤FAR.

Figure 2:
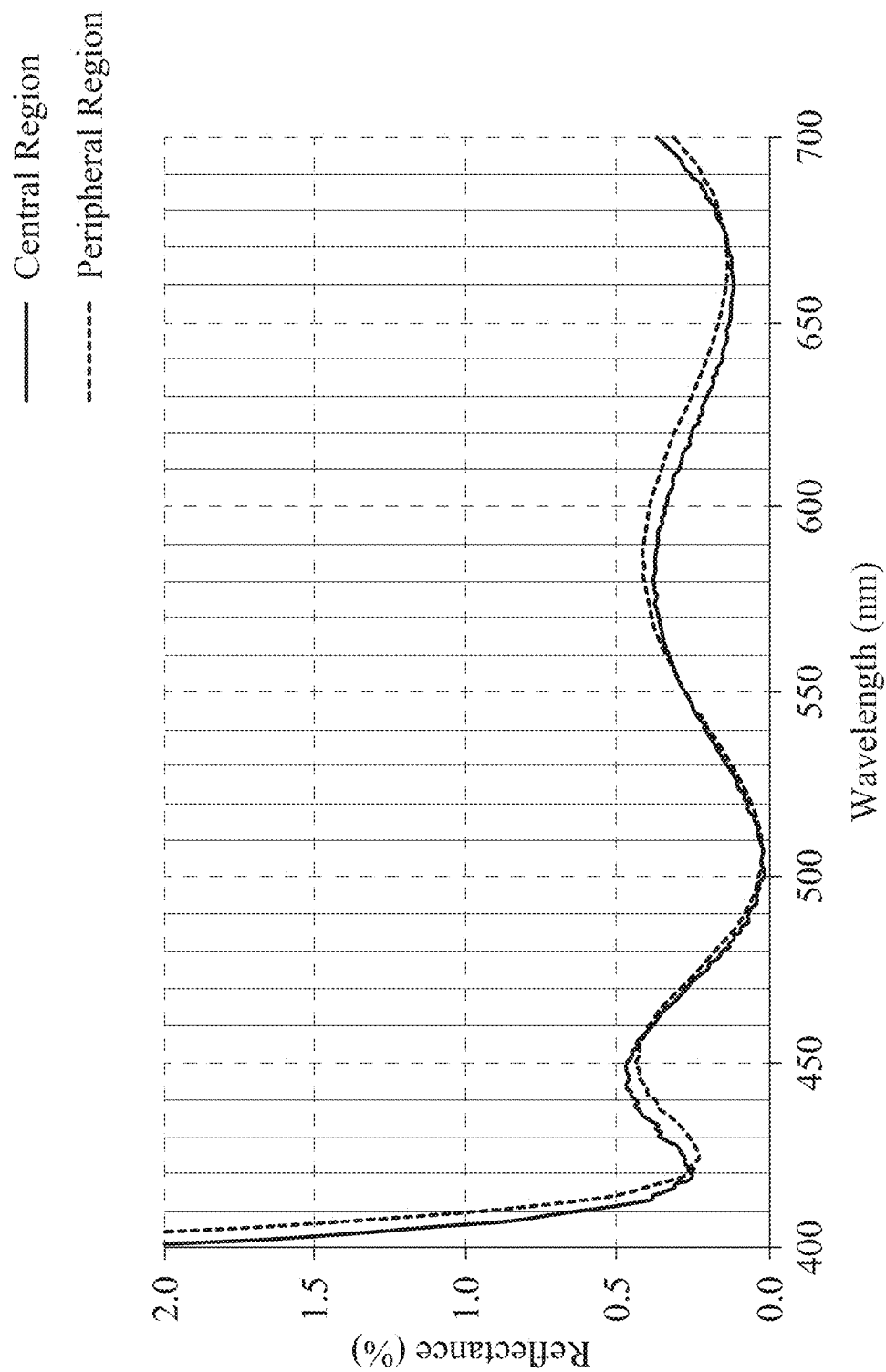
FIG. 2 is a relationship diagram of reflectance and wavelength of the optical lens assembly according to the 2nd embodiment.

Please refer to FIG. 2. FIG. 2 is a relationship diagram of reflectance and wavelength of the optical lens assembly according to the 2nd embodiment. The parameter values of each of the optical lens elements in the optical lens assembly according to the 2nd embodiment are shown in Table 2 below. The definitions of these parameters shown in the following table are the same as those stated in the 1st embodiment with corresponding values for the 2nd embodiment, so an explanation in this regard will not be provided again.

TABLE 2

Optical Lens Assembly of 2nd Embodiment

| FOV (degrees) |  | 72.37 | | | | |
|---|---|---|---|---|---|---|
|  |  | L1 | L2 | L3 | L4 | L5 |
| CTs |  | 0.50 | 0.24 | 0.39 | 0.38 | 1.23 |
| Ns (at wavelength of 587.6 nm) |  | 1.54 | 1.64 | 1.54 | 1.64 | 1.54 |

TABLE 2-continued

Optical Lens Assembly of 2nd Embodiment

FOV (degrees) 72.37

| | | | | | | |
|---|---|---|---|---|---|---|
| | Far3= $(1/(Ns-1))^2$ | 3.38 | 2.44 | 3.38 | 2.44 | 3.38 |
| R1 | \|SAGmax\| | 0.31 | 0.07 | 0.11 | 0.50 | 0.09 |
| | Far1= \|SAGmax\|/CTs | 0.621 | 0.297 | 0.273 | 1.323 | 0.069 |
| | \|SPmin\| | 1.47 | 10.00 | 1.96 | 1.79 | 5.56 |
| | \|SPavg\| | 3.02 | 13.33 | 9.43 | 2.67 | 12.82 |
| | Far2= $1/(\|SPavg\| \times \|SPmin\|)$ | 0.225 | 0.008 | 0.054 | 0.210 | 0.014 |
| | FAR= LOG(Far1 × Far2 × Far3) | −0.326 | −2.265 | −1.303 | −0.168 | −2.482 |
| R2 | \|SAGmax\| | 0.02 | 0.26 | 0.28 | 0.53 | 0.17 |
| | Far1= \|SAGmax\|/CTs | 0.044 | 1.090 | 0.724 | 1.395 | 0.142 |
| | \|SPmin\| | 8.33 | 1.37 | 1.82 | 1.75 | 2.50 |
| | \|SPavg\| | 33.33 | 3.64 | 4.10 | 2.93 | 6.17 |
| | Far2= $1/(\|SPavg\| \times \|SPmin\|)$ | 0.004 | 0.201 | 0.134 | 0.194 | 0.065 |
| | FAR= LOG(Far1 × Far2 × Far3) | −3.268 | −0.272 | −0.484 | −0.179 | −1.507 |

3rd Embodiment

The optical lens assembly according to the 3rd embodiment includes five optical lens elements, which are, from an object side to an image side, an optical lens element L1, an optical lens element L2, an optical lens element L3, an optical lens element L4 and an optical lens element L5. At least one of the five optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: |Tc−Tp|/Tc≤5.00%; and −1.5≤FAR.

Figure 3:
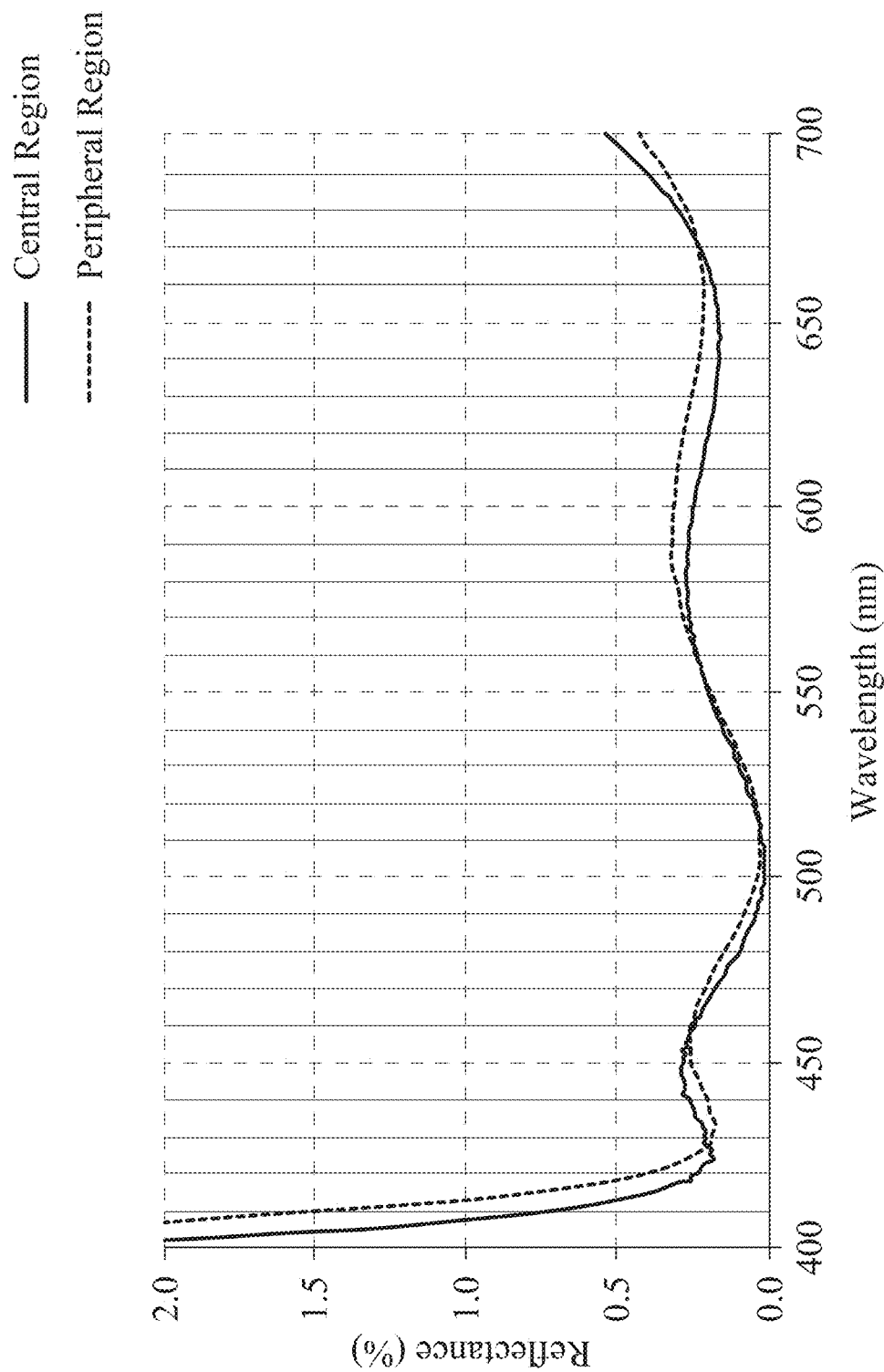
FIG. 3 is a relationship diagram of reflectance and wavelength of the optical lens assembly according to the 3rd embodiment.

Please refer to FIG. 3. FIG. 3 is a relationship diagram of reflectance and wavelength of the optical lens assembly according to the 3rd embodiment. The parameter values of each of the optical lens elements in the optical lens assembly according to the 3rd embodiment are shown in Table 3 below. The definitions of these parameters shown in the following table are the same as those stated in the 1st embodiment with corresponding values for the 3rd embodiment, so an explanation in this regard will not be provided again.

TABLE 3

Optical Lens Assembly of 3rd Embodiment
FOV (degrees) 74.74

| | | L1 | L2 | L3 | L4 | L5 |
|---|---|---|---|---|---|---|
| | CTs | 0.63 | 0.25 | 0.26 | 0.64 | 0.32 |
| | Ns (at wavelength of 587.6 nm) | 1.54 | 1.64 | 1.64 | 1.54 | 1.54 |
| | Far3 = $(1/(Ns − 1))^2$ | 3.38 | 2.45 | 2.45 | 3.38 | 3.38 |
| R1 | \|SAGmax\| | 0.34 | 0.01 | 0.10 | 0.15 | 0.62 |
| | Far1 = \|SAGmax\|/CTs | 0.535 | 0.058 | 0.370 | 0.228 | 1.911 |
| | \|SPmin\| | 1.27 | 8.33 | 3.50 | 5.03 | 1.75 |
| | \|SPavg\| | 2.67 | 43.48 | 9.09 | 9.26 | 3.32 |
| | Far2 = $1/(\|SPavg\| \times \|SPmin\|)$ | 0.295 | 0.003 | 0.031 | 0.021 | 0.172 |
| | FAR = LOG(Far1 × Far2 × Far3) | −0.273 | −3.405 | −1.545 | −1.781 | 0.046 |
| R2 | \|SAGmax\| | 0.01 | 0.18 | 0.09 | 0.49 | 0.41 |
| | Far1 = \|SAGmax\|/CTs | 0.010 | 0.730 | 0.327 | 0.765 | 1.272 |
| | \|SPmin\| | 2.79 | 1.39 | 4.55 | 1.98 | 1.11 |
| | \|SPavg\| | 29.41 | 4.61 | 11.90 | 3.17 | 3.45 |
| | Far2 = $1/(\|SPavg\| \times \|SPmin\|)$ | 0.012 | 0.156 | 0.018 | 0.159 | 0.262 |
| | FAR = LOG(Far1 × Far2 × Far3) | −3.373 | −0.555 | −1.830 | −0.386 | 0.052 |

4th Embodiment

The optical lens assembly according to the 4th embodiment includes six optical lens elements, which are, from an object side to an image side, an optical lens element L1, an optical lens element L2, an optical lens element L3, an optical lens element L4, an optical lens element L5 and an optical lens element L6. At least one of the six optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: |Tc−Tp|/Tc≤5.00%; and −1.5≤FAR.

The parameter values of each of the optical lens elements in the optical lens assembly according to the 4th embodiment are shown in Table 4 below. The definitions of these parameters shown in the following table are the same as those stated in the 1st embodiment with corresponding values for the 4th embodiment, so an explanation in this regard will not be provided again.

TABLE 4

Optical Lens Assembly of 4th Embodiment
FOV (degrees) 83.97

|  |  | L1 | L2 | L3 | L4 | L5 | L6 |
|---|---|---|---|---|---|---|---|
| CTs |  | 0.82 | 0.28 | 0.55 | 0.35 | 0.77 | 0.59 |
| Ns (at wavelength of 587.6 nm) |  | 1.54 | 1.69 | 1.54 | 1.59 | 1.54 | 1.53 |
| Far3 = $(1/(Ns - 1))^2$ |  | 3.37 | 2.12 | 3.38 | 2.90 | 3.38 | 3.51 |
| R1 | |SAGmax| | 0.58 | 0.06 | 0.11 | 0.29 | 1.06 | 0.44 |
|  | Far1 = |SAGmax|/CTs | 0.711 | 0.208 | 0.201 | 0.830 | 1.811 | 0.581 |
|  | |SPmin| | 1.21 | 4.65 | 2.34 | 1.35 | 1.42 | 1.81 |
|  | |SPavg| | 2.53 | 19.23 | 11.24 | 5.15 | 3.24 | 5.71 |
|  | Far2 = 1/(|SPavg| × |SPmin|) | 0.326 | 0.011 | 0.038 | 0.144 | 0.217 | 0.097 |
|  | FAR = LOG(Far1 × Far2 × Far3) | −0.107 | −2.306 | −1.587 | −0.460 | 0.140 | −0.722 |
| R2 | |SAGmax| | 0.07 | 0.17 | 0.24 | 0.23 | 0.88 | 0.88 |
|  | Far1 = |SAGmax|/CTs | 0.090 | 0.609 | 0.437 | 0.659 | 1.501 | 1.144 |
|  | |SPmin| | 11.90 | 1.67 | 1.86 | 3.03 | 1.21 | 2.21 |
|  | |SPavg| | 18.52 | 6.17 | 6.54 | 6.94 | 3.36 | 3.45 |
|  | Far2 = 1/(|SPavg| × |SPmin|) | 0.005 | 0.097 | 0.082 | 0.048 | 0.247 | 0.131 |
|  | FAR = LOG(Far1 × Far2 × Far3) | −2.861 | −0.900 | −0.915 | −1.042 | 0.114 | −0.294 |

5th Embodiment

The optical lens assembly according to the 5th embodiment includes six optical lens elements, which are, from an object side to an image side, an optical lens element L1, an optical lens element L2, an optical lens element L3, an optical lens element L4, an optical lens element L5 and an optical lens element L6. At least one of the six optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: |Tc−Tp|/Tc≤5.00%; and −1.5≤FAR.

The parameter values of each of the optical lens elements in the optical lens assembly according to the 5th embodiment are shown in Table 5 below. The definitions of these parameters shown in the following table are the same as those stated in the 1st embodiment with corresponding values for the 5th embodiment, so an explanation in this regard will not be provided again.

TABLE 5

Optical Lens Assembly of 5th Embodiment
FOV (degrees) 85.45

|  |  | L1 | L2 | L3 | L4 | L5 | L6 |
|---|---|---|---|---|---|---|---|
| CTs |  | 0.82 | 0.28 | 0.55 | 0.35 | 0.77 | 0.59 |
| Ns (at wavelength of 587.6 nm) |  | 1.54 | 1.69 | 1.54 | 1.59 | 1.54 | 1.53 |
| Far3 = $(1/(Ns - 1))^2$ |  | 3.37 | 2.12 | 3.38 | 2.90 | 3.38 | 3.51 |
| R1 | |SAGmax| | 0.58 | 0.06 | 0.11 | 0.35 | 1.06 | 0.45 |
|  | Far1 = |SAGmax|/CTs | 0.711 | 0.208 | 0.202 | 0.995 | 1.811 | 0.590 |
|  | |SPmin| | 1.21 | 4.65 | 2.34 | 1.33 | 1.42 | 1.81 |
|  | |SPavg| | 2.53 | 19.23 | 11.24 | 4.67 | 3.25 | 5.85 |
|  | Far2 = 1/(|SPavg| × |SPmin|) | 0.326 | 0.011 | 0.038 | 0.161 | 0.216 | 0.094 |
|  | FAR = LOG(Far1 × Far2 × Far3) | −0.107 | −2.306 | −1.585 | −0.334 | 0.138 | −0.725 |
| R2 | |SAGmax| | 0.07 | 0.17 | 0.24 | 0.31 | 0.88 | 0.90 |
|  | Far1 = |SAGmax|/CTs | 0.090 | 0.596 | 0.439 | 0.900 | 1.503 | 1.172 |
|  | |SPmin| | 11.90 | 1.67 | 1.86 | 1.08 | 1.21 | 2.21 |
|  | |SPavg| | 18.52 | 6.17 | 6.58 | 5.85 | 3.36 | 3.48 |
|  | Far2 = 1/(|SPavg| × |SPmin|) | 0.005 | 0.097 | 0.082 | 0.158 | 0.247 | 0.130 |

TABLE 5-continued

Optical Lens Assembly of 5th Embodiment
FOV (degrees) 85.45

| | L1 | L2 | L3 | L4 | L5 | L6 |
|---|---|---|---|---|---|---|
| FAR = LOG(Far1 × Far2 × Far3) | −2.861 | −0.910 | −0.915 | −0.384 | 0.115 | −0.288 |

6th Embodiment

The optical lens assembly according to the 6th embodiment includes seven optical lens elements, which are, from an object side to an image side, an optical lens element L1, an optical lens element L2, an optical lens element L3, an optical lens element L4, an optical lens element L5, an optical lens element L6 and an optical lens element L7. At least one of the seven optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: |Tc−Tp|/Tc≤5.00%; and −1.5≤FAR.

Figure 4:
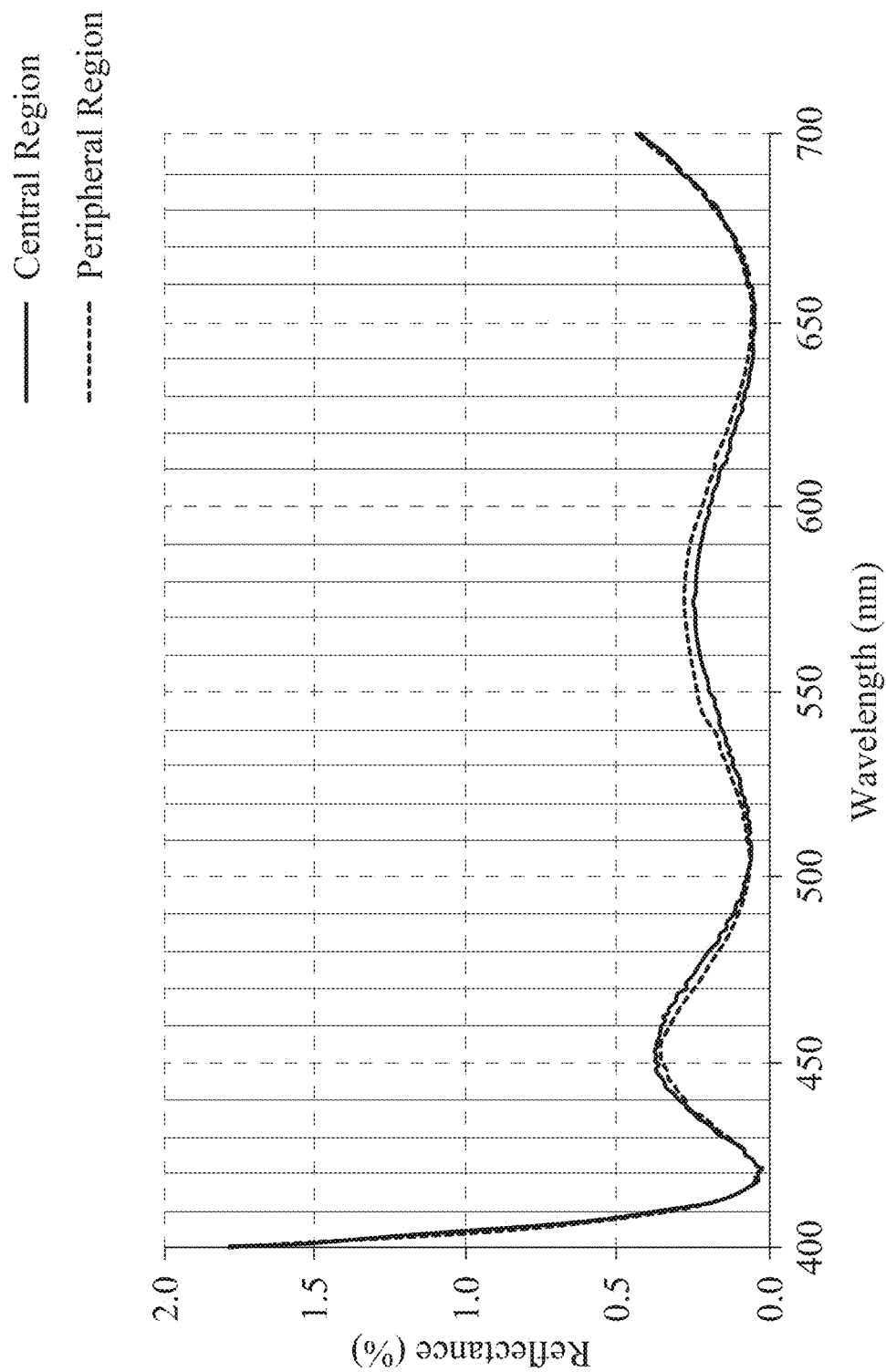
FIG. 4 is a relationship diagram of reflectance and wavelength of the optical lens assembly according to the 6th embodiment.

Please refer to FIG. 4. FIG. 4 is a relationship diagram of reflectance and wavelength of the optical lens assembly according to the 6th embodiment. The parameter values of each of the optical lens elements in the optical lens assembly according to the 6th embodiment are shown in Table 6 below. The definitions of these parameters shown in the following table are the same as those stated in the 1st embodiment with corresponding values for the 6th embodiment, so an explanation in this regard will not be provided again.

TABLE 6

Optical Lens Assembly of 6th Embodiment
FOV (degrees) 78.95

| | | L1 | L2 | L3 | L4 | L5 | L6 | L7 |
|---|---|---|---|---|---|---|---|---|
| CTs | | 0.90 | 0.36 | 0.58 | 0.41 | 1.16 | 0.51 | 0.54 |
| Ns (at wavelength of 587.6 nm) | | 1.54 | 1.66 | 1.54 | 1.66 | 1.54 | 1.54 | 1.54 |
| Far3 = (1/(Ns − 1))² | | 3.38 | 2.30 | 3.38 | 2.30 | 3.38 | 3.38 | 3.38 |
| R1 | |SAGmax| | 0.50 | 0.17 | 0.14 | 0.14 | 0.51 | 0.83 | 0.13 |
| | Far1 = |SAGmax|/CTs | 0.556 | 0.475 | 0.244 | 0.345 | 1.005 | 1.528 | 0.115 |
| | |SPmin| | 2.08 | 3.91 | 1.78 | 2.92 | 0.79 | 1.79 | 9.17 |
| | |SPavg| | 3.77 | 10.31 | 11.36 | 9.17 | 2.59 | 3.70 | 15.87 |
| | Far2 = 1/(|SPavg| × |SPmin|) | 0.127 | 0.025 | 0.049 | 0.037 | 0.488 | 0.151 | 0.007 |
| | FAR = LOG(Far1 × Far2 × Far3) | −0.621 | −1.567 | −1.390 | −1.528 | 0.220 | −0.107 | −2.573 |
| R2 | |SAGmax| | 0.05 | 0.27 | 0.37 | 0.08 | 0.42 | 0.60 | 0.70 |
| | Far1 = |SAGmax|/CTs | 0.058 | 0.755 | 0.635 | 0.187 | 0.814 | 1.107 | 0.607 |
| | |SPmin| | 5.21 | 2.19 | 1.04 | 4.35 | 0.81 | 1.47 | 1.78 |
| | |SPavg| | 35.71 | 5.92 | 4.65 | 15.38 | 2.67 | 3.41 | 3.50 |
| | Far2 = 1/(|SPavg| × |SPmin|) | 0.005 | 0.077 | 0.206 | 0.015 | 0.463 | 0.199 | 0.161 |
| | FAR = LOG(Far1 × Far2 × Far3) | −2.975 | −0.874 | −0.353 | −2.192 | 0.105 | −0.128 | −0.481 |

7th Embodiment

The optical lens assembly according to the 7th embodiment includes seven optical lens elements, which are, from an object side to an image side, an optical lens element L1, an optical lens element L2, an optical lens element L3, an optical lens element L4, an optical lens element L5, an optical lens element L6 and an optical lens element L7. At least one of the seven optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: |Tc−Tp|/Tc≤5.00%; and −1.5≤FAR.

Figure 5:
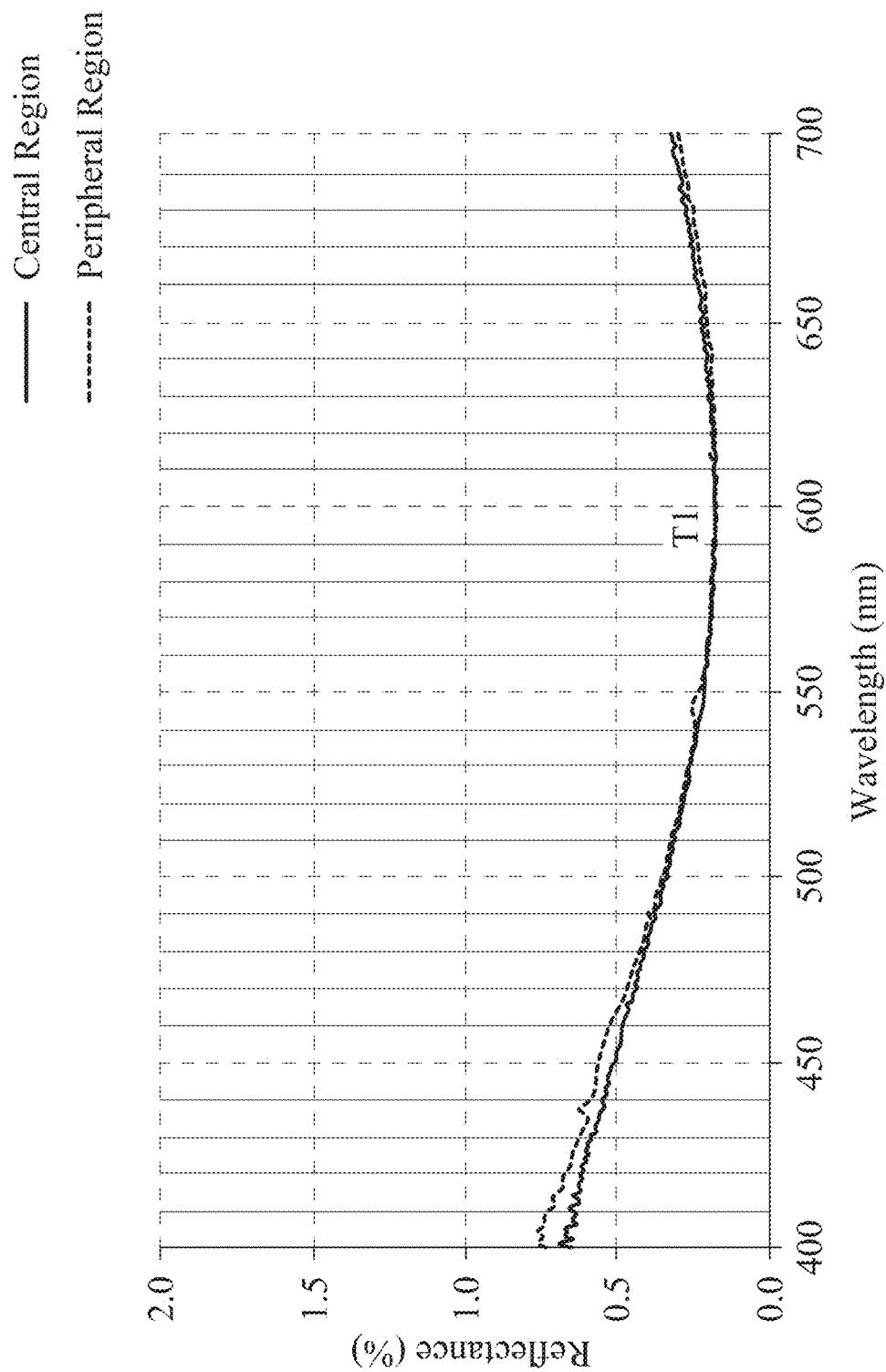
FIG. 5 is a relationship diagram of reflectance and wavelength of the optical lens assembly according to the 7th embodiment.

Please refer to FIG. 5. FIG. 5 is a relationship diagram of reflectance and wavelength of the optical lens assembly according to the 7th embodiment. The parameter values of each of the optical lens elements in the optical lens assembly according to the 7th embodiment are shown in Table 7 below. The definitions of these parameters shown in the following table are the same as those stated in the 1st embodiment with corresponding values for the 7th embodiment, so an explanation in this regard will not be provided again.

anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical

TABLE 7

Optical Lens Assembly of 7th Embodiment
FOV (degrees) 84.91

| | | L1 | L2 | L3 | L4 | L5 | L6 | L7 |
|---|---|---|---|---|---|---|---|---|
| CTs | | 0.71 | 0.23 | 0.66 | 0.30 | 0.57 | 0.60 | 0.53 |
| Ns (at wavelength of 587.6 nm) | | 1.54 | 1.67 | 1.54 | 1.64 | 1.57 | 1.54 | 1.53 |
| Far3 = $(1/(Ns − 1))^2$ | | 3.37 | 2.23 | 3.38 | 2.45 | 3.12 | 3.37 | 3.50 |
| R1 | |SAGmax| | 0.53 | 0.16 | 0.13 | 0.48 | 0.33 | 0.32 | 0.41 |
| | Far1 = |SAGmax|/CTs | 0.745 | 0.692 | 0.198 | 1.593 | 0.555 | 0.599 | 0.733 |
| | |SPmin| | 1.29 | 3.69 | 1.77 | 1.56 | 2.17 | 3.55 | 1.74 |
| | |SPavg| | 2.81 | 7.81 | 10.42 | 3.89 | 4.33 | 9.80 | 5.65 |
| | Far2 = 1/(|SPavg| × |SPmin|) | 0.276 | 0.035 | 0.054 | 0.164 | 0.106 | 0.029 | 0.102 |
| | FAR = LOG(Far1 × Far2 × Far3) | −0.160 | −1.271 | −1.440 | −0.193 | −0.702 | −1.219 | −0.632 |
| R2 | |SAGmax| | 0.09 | 0.26 | 0.46 | 0.34 | 0.33 | 0.29 | 0.61 |
| | Far1 = |SAGmax|/CTs | 0.128 | 1.114 | 0.687 | 1.130 | 0.547 | 0.542 | 1.080 |
| | |SPmin| | 9.52 | 1.62 | 0.79 | 2.16 | 1.30 | 3.51 | 2.10 |
| | |SPavg| | 15.87 | 4.42 | 3.68 | 6.06 | 4.12 | 6.29 | 4.42 |
| | Far2 = 1/(|SPavg| × |SPmin|) | 0.007 | 0.140 | 0.346 | 0.076 | 0.187 | 0.045 | 0.108 |
| | FAR = LOG(Far1 × Far2 × Far3) | −2.546 | −0.459 | −0.095 | −0.674 | −0.464 | −1.066 | −0.441 |

8th Embodiment

The optical lens assembly according to the 8th embodiment includes seven optical lens elements, which are, from an object side to an image side, an optical lens element L1, an optical lens element L2, an optical lens element L3, an optical lens element L4, an optical lens element L5, an optical lens element L6 and an optical lens element L7. At least one of the seven optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: |Tc−Tp|/Tc≤5.00%; and −1.5≤FAR.

The parameter values of each of the optical lens elements in the optical lens assembly according to the 8th embodiment are shown in Table 8 below. The definitions of these parameters shown in the following table are the same as those stated in the 1st embodiment with corresponding values for the 8th embodiment, so an explanation in this regard will not be provided again.

TABLE 8

Optical Lens Assembly of 8th Embodiment
FOV (degrees) 84.98

| | | L1 | L2 | L3 | L4 | L5 | L6 | L7 |
|---|---|---|---|---|---|---|---|---|
| CTs | | 0.83 | 0.25 | 0.28 | 0.60 | 0.38 | 0.54 | 0.50 |
| Ns (at wavelength of 587.6 nm) | | 1.54 | 1.69 | 1.67 | 1.54 | 1.57 | 1.54 | 1.53 |
| Far3 = $(1/(Ns − 1))^2$ | | 3.37 | 2.12 | 2.23 | 3.38 | 3.12 | 3.38 | 3.50 |
| R1 | |SAGmax| | 0.64 | 0.17 | 0.10 | 0.05 | 0.51 | 1.10 | 0.59 |
| | Far1 = |SAGmax|/CTs | 0.777 | 0.698 | 0.370 | 0.091 | 0.949 | 2.205 | 1.544 |

TABLE 8-continued

Optical Lens Assembly of 8th Embodiment
FOV (degrees) 84.98

|  |  | L1 | L2 | L3 | L4 | L5 | L6 | L7 |
|---|---|---|---|---|---|---|---|---|
|  | \|SPmin\| | 1.15 | 2.16 | 2.49 | 3.52 | 1.20 | 1.43 | 0.75 |
|  | \|SPavg\| | 2.43 | 7.75 | 11.11 | 18.87 | 3.34 | 3.45 | 3.41 |
|  | Far2 = 1/(\|SPavg\| × \|SPmin\|) | 0.357 | 0.060 | 0.036 | 0.015 | 0.250 | 0.203 | 0.390 |
|  | FAR = LOG(Far1 × Far2 × Far3) | −0.030 | −1.054 | −1.525 | −2.333 | −0.096 | 0.195 | 0.274 |
| R2 | \|SAGmax\| | 0.09 | 0.25 | 0.08 | 0.35 | 0.70 | 1.14 | 0.45 |
|  | Far1 = \|SAGmax\|/CTs | 0.113 | 1.007 | 0.274 | 0.587 | 1.309 | 2.280 | 1.190 |
|  | \|SPmin\| | 9.35 | 1.44 | 4.50 | 1.82 | 1.45 | 1.33 | 2.08 |
|  | \|SPavg\| | 16.13 | 4.72 | 14.08 | 5.13 | 3.38 | 3.05 | 5.65 |
|  | Far2 = 1/(\|SPavg\| × \|SPmin\|) | 0.007 | 0.147 | 0.016 | 0.107 | 0.205 | 0.246 | 0.085 |
|  | FAR = LOG(Far1 × Far2 × Far3) | −2.600 | −0.502 | −2.015 | −0.674 | −0.043 | 0.293 | −0.501 |

9th Embodiment

The optical lens assembly according to the 9th embodiment includes seven optical lens elements, which are, from an object side to an image side, an optical lens element L1, an optical lens element L2, an optical lens element L3, an optical lens element L4, an optical lens element L5, an optical lens element L6 and an optical lens element L7. At least one of the seven optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: |Tc−Tp|/Tc≤5.00%; and −1.5≤FAR.

The parameter values of each of the optical lens elements in the optical lens assembly according to the 9th embodiment are shown in Table 9 below. The definitions of these parameters shown in the following table are the same as those stated in the 1st embodiment with corresponding values for the 9th embodiment, so an explanation in this regard will not be provided again.

TABLE 9

Optical Lens Assembly of 9th Embodiment
FOV (degrees) 85.05

|  |  | L1 | L2 | L3 | L4 | L5 | L6 | L7 |
|---|---|---|---|---|---|---|---|---|
|  | CTs | 0.85 | 0.29 | 0.29 | 0.49 | 0.36 | 0.51 | 0.54 |
|  | Ns (at wavelength of 587.6 nm) | 1.54 | 1.69 | 1.69 | 1.54 | 1.59 | 1.54 | 1.53 |
|  | Far3 = (1/(Ns − 1))² | 3.37 | 2.12 | 2.12 | 3.38 | 2.90 | 3.38 | 3.50 |
| R1 | \|SAGmax\| | 0.61 | 0.16 | 0.17 | 0.13 | 0.61 | 0.84 | 1.40 |
|  | Far1 = \|SAGmax\|/CTs | 0.719 | 0.561 | 0.594 | 0.273 | 1.700 | 1.642 | 2.581 |
|  | \|SPmin\| | 1.33 | 2.78 | 1.95 | 3.88 | 0.73 | 0.79 | 1.45 |
|  | \|SPavg\| | 2.73 | 9.01 | 7.35 | 11.49 | 3.39 | 2.36 | 3.16 |
|  | Far2 = 1/(\|SPavg\| × \|SPmin\|) | 0.276 | 0.040 | 0.070 | 0.022 | 0.402 | 0.539 | 0.218 |
|  | FAR = LOG(Far1 × Far2 × Far3) | −0.176 | −1.322 | −1.056 | −1.685 | 0.297 | 0.476 | 0.294 |
| R2 | \|SAGmax\| | 0.09 | 0.24 | 0.19 | 0.34 | 0.53 | 1.07 | 1.47 |
|  | Far1 = \|SAGmax\|/CTs | 0.102 | 0.850 | 0.656 | 0.701 | 1.473 | 2.078 | 2.704 |
|  | \|SPmin\| | 10.64 | 1.46 | 2.21 | 2.54 | 1.71 | 0.67 | 1.11 |
|  | \|SPavg\| | 18.52 | 5.13 | 7.30 | 5.35 | 4.69 | 2.50 | 2.75 |
|  | Far2 = 1/(\|SPavg\| × \|SPmin\|) | 0.005 | 0.133 | 0.062 | 0.073 | 0.124 | 0.598 | 0.328 |

TABLE 9-continued

Optical Lens Assembly of 9th Embodiment
FOV (degrees) 85.05

|  | L1 | L2 | L3 | L4 | L5 | L6 | L7 |
|---|---|---|---|---|---|---|---|
| FAR = LOG(Far1 × Far2 × Far3) | −2.759 | −0.618 | −1.064 | −0.759 | −0.274 | 0.623 | 0.492 |

10th Embodiment

The optical lens assembly according to the 10th embodiment includes eight optical lens elements, which are, from an object side to an image side, an optical lens element L1, an optical lens element L2, an optical lens element L3, an optical lens element L4, an optical lens element L5, an optical lens element L6, an optical lens element L7 and an optical lens element L8. At least one of the eight optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: |Tc−Tp|/Tc≤5.00%; and −1.5≤FAR.

The parameter values of each of the optical lens elements in the optical lens assembly according to the 10th embodiment are shown in Table 10 below. The definitions of these parameters shown in the following table are the same as those stated in the 1st embodiment with corresponding values for the 10th embodiment, so an explanation in this regard will not be provided again.

TABLE 10

Optical Lens Assembly of 10th Embodiment
FOV (degrees) 84.69

|  |  | L1 | L2 | L3 | L4 | L5 | L6 | L7 | L8 |
|---|---|---|---|---|---|---|---|---|---|
|  | CTs | 0.95 | 0.30 | 0.34 | 0.55 | 0.51 | 0.43 | 0.71 | 0.63 |
|  | Ns (at wavelength of 587.6 nm) | 1.54 | 1.69 | 1.69 | 1.54 | 1.54 | 1.57 | 1.54 | 1.53 |
|  | Far3 = (1/(Ns − 1))² | 3.37 | 2.12 | 2.12 | 3.38 | 3.38 | 3.12 | 3.38 | 3.51 |
| R1 | |SAGmax| | 0.71 | 0.21 | 0.10 | 0.07 | 0.82 | 0.69 | 1.35 | 0.31 |
|  | Far1 = |SAGmax|/CTs | 0.747 | 0.692 | 0.304 | 0.125 | 1.917 | 0.971 | 2.149 | 0.612 |
|  | |SPmin| | 1.32 | 2.40 | 8.00 | 5.75 | 0.71 | 1.38 | 1.93 | 3.00 |
|  | |SPavg| | 2.74 | 8.00 | 15.38 | 20.00 | 2.77 | 3.19 | 3.94 | 8.06 |
|  | Far2 = 1/(|SPavg| × |SPmin|) | 0.276 | 0.052 | 0.008 | 0.009 | 0.508 | 0.228 | 0.132 | 0.041 |
|  | FAR = LOG(Far1 × Far2 × Far3) | −0.159 | −1.116 | −2.280 | −2.436 | 0.482 | −0.127 | −0.003 | −1.069 |
| R2 | |SAGmax| | 0.14 | 0.31 | 0.13 | 0.24 | 0.71 | 0.92 | 1.31 | 0.41 |
|  | Far1 = |SAGmax|/CTs | 0.144 | 1.036 | 0.385 | 0.432 | 1.647 | 1.294 | 2.085 | 0.812 |
|  | |SPmin| | 8.62 | 1.56 | 3.27 | 2.66 | 1.27 | 1.27 | 1.79 | 2.43 |
|  | |SPavg| | 13.51 | 4.81 | 11.63 | 8.85 | 3.46 | 3.56 | 3.75 | 6.94 |
|  | Far2 = 1/(|SPavg| × |SPmin|) | 0.009 | 0.134 | 0.026 | 0.042 | 0.228 | 0.221 | 0.149 | 0.059 |
|  | FAR = LOG(Far1 × Far2 × Far3) | −2.380 | −0.532 | −1.667 | −1.207 | 0.069 | −0.014 | 0.038 | −0.788 |

11th Embodiment

The optical lens assembly according to the 11th embodiment includes eight optical lens elements, which are, from an object side to an image side, an optical lens element L1, an optical lens element L2, an optical lens element L3, an optical lens element L4, an optical lens element L5, an optical lens element L6, an optical lens element L7 and an optical lens element L8. At least one of the eight optical lens elements includes an anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: |Tc−Tp|/Tc≤5.00%; and −1.5≤FAR.

The parameter values of each of the optical lens elements in the optical lens assembly according to the 11th embodiment are shown in Table 11 below. The definitions of these parameters shown in the following table are the same as those stated in the 1st embodiment with corresponding values for the 11th embodiment, so an explanation in this regard will not be provided again.

anti-reflective coating. The at least one optical lens element including the anti-reflective coating is made of a plastic material. The anti-reflective coating is arranged on an object-side surface or an image-side surface of the at least one optical lens element including the anti-reflective coating. The anti-reflective coating includes at least one coating layer. One of the at least one coating layer at the outer of the anti-reflective coating is made of ceramics. The anti-reflective coating includes a plurality of holes, and sizes of the plurality of holes adjacent to the outer of the anti-reflective coating are larger than sizes of the plurality of holes adjacent to the inner of the anti-reflective coating. When a total thickness of the anti-reflective coating at a central region of the at least one optical lens element including the anti-reflective coating is Tc, a total thickness of the anti-reflective coating at a peripheral region of the at least one optical lens element including the anti-reflective coating is Tp, and a major anti-reflective coating arranging factor of the optical lens assembly is FAR, the following conditions are satisfied: |Tc−Tp|/Tc≤5.00%; and −1.5≤FAR.

TABLE 11

Optical Lens Assembly of 11th Embodiment
FOV (degrees) 85.11

| | | L1 | L2 | L3 | L4 | L5 | L6 | L7 | L8 |
|---|---|---|---|---|---|---|---|---|---|
| CTs | | 1.15 | 0.33 | 0.34 | 0.61 | 0.39 | 0.43 | 0.69 | 0.86 |
| Ns (at wavelength of 587.6 nm) | | 1.54 | 1.69 | 1.69 | 1.54 | 1.67 | 1.59 | 1.57 | 1.53 |
| Far3 = $(1/(Ns − 1))^2$ | | 3.37 | 2.12 | 2.12 | 3.38 | 2.23 | 2.90 | 3.12 | 3.50 |
| R1 | |SAGmax| | 0.97 | 0.24 | 0.09 | 0.14 | 0.85 | 1.32 | 1.87 | 0.36 |
| | Far1 = |SAGmax|/CTs | 0.840 | 0.741 | 0.271 | 0.230 | 2.002 | 1.910 | 2.164 | 0.906 |
| | |SPmin| | 1.01 | 2.06 | 6.02 | 4.29 | 0.65 | 0.92 | 1.50 | 2.34 |
| | |SPavg| | 2.24 | 8.20 | 19.23 | 12.82 | 2.92 | 2.60 | 3.10 | 6.17 |
| | Far2 = 1/(|SPavg| × |SPmin|) | 0.445 | 0.059 | 0.009 | 0.018 | 0.530 | 0.417 | 0.216 | 0.069 |
| | FAR = LOG(Far1 × Far2 × Far3) | 0.100 | −1.030 | −2.304 | −1.850 | 0.488 | 0.395 | 0.214 | −0.853 |
| R2 | |SAGmax| | 0.20 | 0.34 | 0.09 | 0.40 | 0.87 | 1.47 | 2.03 | 0.33 |
| | Far1 = |SAGmax|/CTs | 0.172 | 1.037 | 0.277 | 0.655 | 2.034 | 2.124 | 2.351 | 0.843 |
| | |SPmin| | 5.29 | 1.54 | 3.77 | 1.29 | 1.32 | 1.32 | 1.17 | 2.61 |
| | |SPavg| | 10.31 | 5.26 | 17.86 | 5.15 | 3.60 | 2.82 | 3.00 | 7.30 |
| | Far2 = 1/(|SPavg| × |SPmin|) | 0.018 | 0.124 | 0.015 | 0.150 | 0.210 | 0.267 | 0.284 | 0.052 |
| | FAR = LOG(Far1 × Far2 × Far3) | −1.975 | −0.565 | −2.058 | −0.478 | 0.093 | 0.248 | 0.369 | −1.005 |

12th Embodiment

The optical lens assembly according to the 12th embodiment includes nine optical lens elements, which are, from an object side to an image side, an optical lens element L1, an optical lens element L2, an optical lens element L3, an optical lens element L4, an optical lens element L5, an optical lens element L6, an optical lens element L7, an optical lens element L8 and an optical lens element L9. At least one of the nine optical lens elements includes an The parameter values of each of the optical lens elements in the optical lens assembly according to the 12th embodiment are shown in Table 12 below. The definitions of these parameters shown in the following table are the same as those stated in the 1st embodiment with corresponding values for the 12th embodiment, so an explanation in this regard will not be provided again.

TABLE 12

Optical Lens Assembly of 12th Embodiment
FOV (degrees) 86.76

| | | L1 | L2 | L3 | L4 | L5 | L6 | L7 | L8 | L9 |
|---|---|---|---|---|---|---|---|---|---|---|
| CTs | | 1.14 | 0.31 | 0.32 | 0.50 | 0.36 | 0.43 | 0.52 | 0.64 | 0.71 |
| Ns (at wavelength of 587.6 nm) | | 1.54 | 1.69 | 1.69 | 1.54 | 1.66 | 1.64 | 1.59 | 1.54 | 1.53 |
| Far3 = $(1/(Ns − 1))^2$ | | 3.37 | 2.12 | 2.12 | 3.38 | 2.30 | 2.45 | 2.90 | 3.38 | 3.50 |
| R1 | |SAGmax| | 0.96 | 0.24 | 0.11 | 0.12 | 0.94 | 1.56 | 1.02 | 1.51 | 0.28 |
| | Far1 = |SAGmax|/CTs | 0.837 | 0.780 | 0.336 | 0.247 | 2.170 | 2.992 | 1.594 | 2.120 | 0.788 |
| | |SPmin| | 1.06 | 1.72 | 5.52 | 5.29 | 0.43 | 0.88 | 2.00 | 2.19 | 2.98 |

TABLE 12-continued

| Optical Lens Assembly of 12th Embodiment FOV (degrees) 86.76 | | | | | | | | | | |
|---|---|---|---|---|---|---|---|---|---|---|
| | | L1 | L2 | L3 | L4 | L5 | L6 | L7 | L8 | L9 |
| | \|SPavg\| | 2.26 | 7.69 | 15.38 | 13.70 | 2.53 | 2.29 | 4.50 | 3.97 | 7.04 |
| | Far2 = 1/(\|SPavg\| × \|SPmin\|) | 0.417 | 0.076 | 0.012 | 0.014 | 0.914 | 0.498 | 0.111 | 0.115 | 0.048 |
| | FAR = LOG(Far1 × Far2 × Far3) | 0.070 | −0.902 | −2.076 | −1.938 | 0.687 | 0.635 | −0.223 | −0.068 | −1.064 |
| R2 | \|SAGmax\| | 0.18 | 0.33 | 0.13 | 0.35 | 0.91 | 1.75 | 1.23 | 1.63 | 0.32 |
| | Far1 = \|SAGmax\|/CTs | 0.160 | 1.075 | 0.415 | 0.702 | 2.088 | 3.350 | 1.924 | 2.291 | 0.897 |
| | \|SPmin\| | 6.02 | 1.32 | 2.17 | 1.09 | 1.23 | 0.71 | 1.72 | 1.72 | 2.82 |
| | \|SPavg\| | 11.36 | 5.00 | 10.75 | 5.88 | 3.34 | 2.20 | 4.18 | 3.75 | 7.04 |
| | Far2 = 1/(\|SPavg\| × \|SPmin\|) | 0.015 | 0.152 | 0.043 | 0.156 | 0.242 | 0.638 | 0.139 | 0.156 | 0.050 |
| | FAR = LOG(Far1 × Far2 × Far3) | −2.103 | −0.460 | −1.422 | −0.431 | 0.094 | 0.793 | −0.044 | 0.097 | −0.985 |

Measurement of Wavelength and Reflectance

The results of reflectance of the 1st comparison and the 1st embodiment are shown in Table 13 below.

TABLE 13

| Reflectance Results of 1st Comparison and 1st Embodiment | | | | | |
|---|---|---|---|---|---|
| | | 1st Comparison | | 1st Embodiment | |
| Number of Optical Lens Elements | | 7 | | 4 | |
| Optical Lens Element Including Anti-Reflective Coating | | L6 | | L4 | |
| Surface of Optical Lens Element Including Anti-Reflective Coating | | Image-Side Surface | | Object-Side Surface and Image-Side Surface | |
| | | Central | Peripheral | Central | Peripheral |
| Trough | T1 | Wtc | Wtp | Wtc | Wtp |
| | Wavelength (nm) | 421 | — | 418 | 430 |
| | | \|Wtc − Wtp\| — | | \|Wtc − Wtp\| 12 | |
| | Reflectance (%) | Rtc 0.1693 | Rtp — | Rtc 0.2992 | Rtp 0.2457 |
| | T2 | Wtc | Wtp | Wtc | Wtp |
| | Wavelength (nm) | 518 | — | 508 | 515 |
| | | \|Wtc − Wtp\| — | | \|Wtc − Wtp\| 7 | |
| | Reflectance (%) | Rtc 0.2943 | Rtp — | Rtc 0.0201 | Rtp 0.0385 |
| | T3 | Wtc | Wtp | Wtc | Wtp |
| | Wavelength (nm) | 650 | 508 | 665 | 686 |
| | | \|Wtc − Wtp\| 142 | | \|Wtc − Wtp\| 21 | |
| | Reflectance (%) | Rtc 0.1263 | Rtp 0.0843 | Rtc 0.0996 | Rtp 0.1651 |
| Crest | C1 | Wcc | Wcp | Wcc | Wcp |
| | Wavelength (nm) | 462 | — | 449 | 457 |
| | | \|Wcc − Wcp\| — | | \|Wcc − Wcp\| 8 | |
| | Reflectance (%) | Rcc 0.4700 | Rcp — | Rcc 0.6566 | Rcp 0.4906 |
| | C2 | Wcc | Wcp | Wcc | Wcp |
| | Wavelength (nm) | 557 | — | 586 | 602 |
| | | \|Wcc − Wcp\| — | | \|Wcc − Wcp\| 16 | |
| | Reflectance (%) | Rcc 0.3309 | Rcp — | Rcc 0.3734 | Rcp 0.5244 |

The results of reflectance of the 2nd embodiment and the 3rd embodiment are shown in Table 14 below.

TABLE 14

Reflectance Results of 2nd Embodiment and 3rd Embodiment

|  |  | 2nd Embodiment | | 3rd Embodiment | |
|---|---|---|---|---|---|
| Number of Optical Lens Elements | | 5 | | 5 | |
| Optical Lens Element Including Anti-Reflective Coating | | L1 | | L4 | |
| Surface of Optical Lens Element Including Anti-Reflective Coating | | Object-Side Surface and Image-Side Surface | | Object-Side Surface and Image-Side Surface | |
|  |  | Central | Peripheral | Central | Peripheral |
| Trough | T1 Wavelength (nm) | Wtc 421 | Wtp 424 | Wtc 424 | Wtp 433 |
|  |  | |Wtc − Wtp| 3 | | |Wtc − Wtp| 9 | |
|  | Reflectance (%) | Rtc 0.2476 | Rtp 0.2290 | Rtc 0.1846 | Rtp 0.1720 |
|  | T2 Wavelength (nm) | Wtc 502 | Wtp 508 | Wtc 506 | Wtp 508 |
|  |  | |Wtc − Wtp| 6 | | |Wtc − Wtp| 2 | |
|  | Reflectance (%) | Rtc 0.0174 | Rtp 0.0201 | Rtc 0.0138 | Rtp 0.0241 |
|  | T3 Wavelength (nm) | Wtc 658 | Wtp 667 | Wtc 645 | Wtp 652 |
|  |  | |Wtc − Wtp| 9 | | |Wtc − Wtp| 7 | |
|  | Reflectance (%) | Rtc 0.1193 | Rtp 0.1372 | Rtc 0.1616 | Rtp 0.2166 |
| Crest | C1 Wavelength (nm) | Wcc 449 | Wcp 453 | Wcc 449 | Wcp 458 |
|  |  | |Wcc − Wcp| 4 | | |Wcc − Wcp| 9 | |
|  | Reflectance (%) | Rcc 0.4738 | Rcp 0.4434 | Rcc 0.2909 | Rcp 0.2669 |
|  | C2 Wavelength (nm) | Wcc 581 | Wcp 582 | Wcc 581 | Wcp 587 |
|  |  | |Wcc − Wcp| 1 | | |Wcc − Wcp| 6 | |
|  | Reflectance (%) | Rcc 0.3815 | Rcp 0.4242 | Rcc 0.2728 | Rcp 0.3223 |

The results of reflectance of the 6th embodiment and the 7th embodiment are shown in Table 15 below.

TABLE 15

Reflectance Results of 6th Embodiment and 7th Embodiment

|  |  | 6th Embodiment | | 7th Embodiment | |
|---|---|---|---|---|---|
| Number of Optical Lens Elements | | 7 | | 7 | |
| Optical Lens Element Including Anti-Reflective Coating | | L6 | | L7 | |
| Surface of Optical Lens Element Including Anti-Reflective Coating | | Image-Side Surface | | Object-Side Surface and Image-Side Surface | |
|  |  | Central | Peripheral | Central | Peripheral |
| Trough | T1 Wavelength (nm) | Wtc 421 | Wtp 420 | Wtc 613 | Wtp 604 |
|  |  | |Wtc − Wtp| 1 | | |Wtc − Wtp| 9 | |
|  | Reflectance (%) | Rtc 0.0232 | Rtp 0.0345 | Rtc 0.1770 | Rtp 0.1735 |
|  | T2 Wavelength (nm) | Wtc 508 | Wtp 504 | Wtc — | Wtp — |
|  |  | |Wtc − Wtp| 4 | | |Wtc − Wtp| — | |
|  | Reflectance (%) | Rtc 0.0602 | Rtp 0.0630 | Rtc — | Rtp — |
|  | T3 | Wtc | Wtp | Wtc | Wtp |

TABLE 15-continued

Reflectance Results of 6th Embodiment and 7th Embodiment

| | Wavelength (nm) | 647 | 650 | — | — |
|---|---|---|---|---|---|
| Crest | | |Wtc − Wtp| | |Wtc − Wtp| | | |
| | | 3 | | — | |
| | Reflectance (%) | Rtc 0.0441 | Rtp 0.0573 | Rtc — | Rtp — |
| | C1 | Wcc | Wcp | Wcc | Wcp |
| | Wavelength (nm) | 450 | 454 | — | — |
| | | |Wcc − Wcp| | |Wcc − Wcp| | | |
| | | 4 | | — | |
| | Reflectance (%) | Rcc 0.3803 | Rcp 0.3615 | Rcc — | Rcp — |
| | C2 | Wcc | Wcp | Wcc | Wcp |
| | Wavelength (nm) | 573 | 573 | — | — |
| | | |Wcc − Wcp| | |Wcc − Wcp| | | |
| | | 0 | | — | |
| | Reflectance (%) | Rcc 0.2479 | Rcp 0.2816 | Rcc — | Rcp — |

Figure 6:
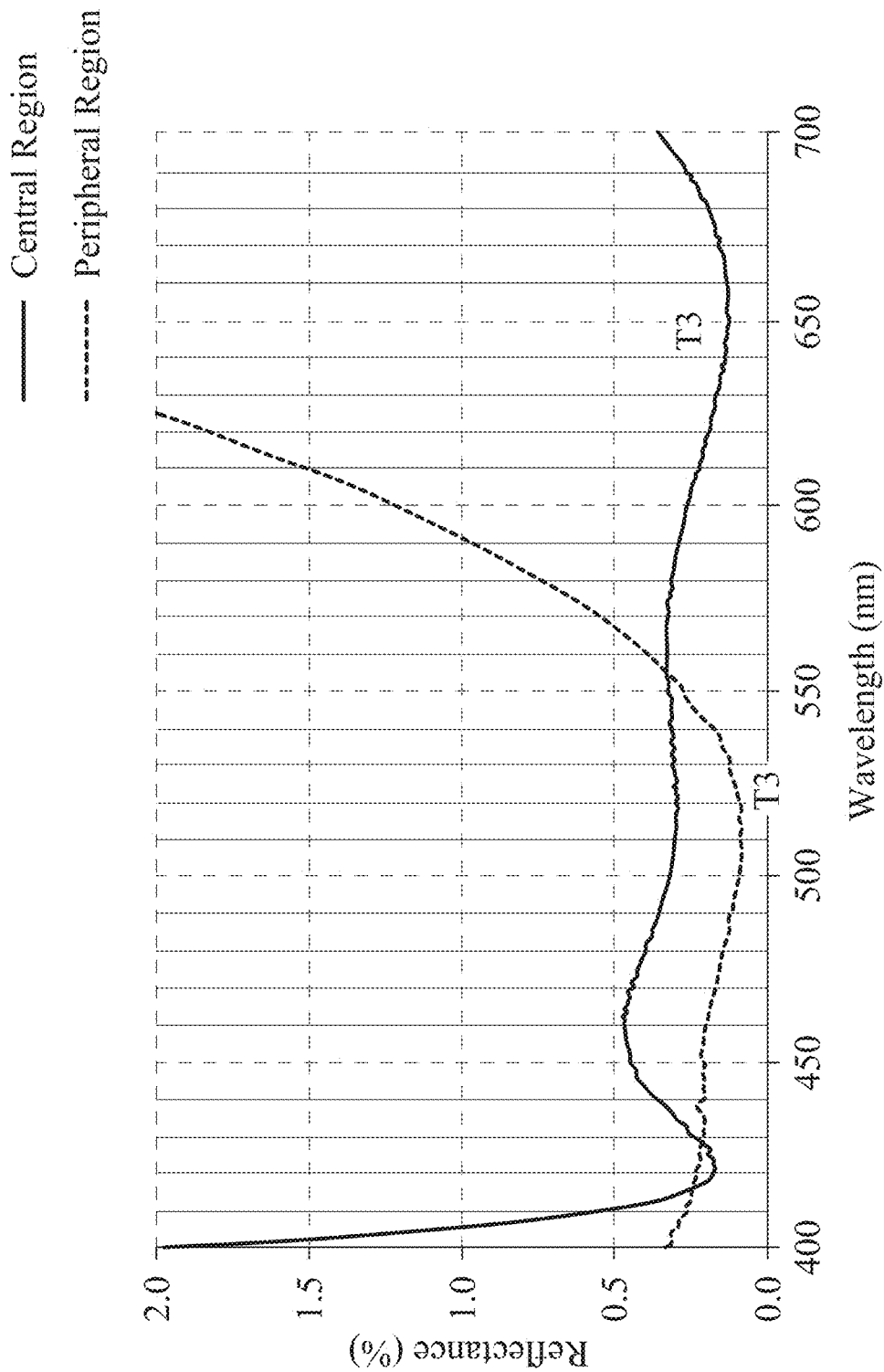
FIG. 6 is a relationship diagram of reflectance and wavelength of the optical lens assembly according to the 1st comparison.

Please refer to FIG. 1 to FIG. 6. FIG. 6 is a relationship diagram of reflectance and wavelength of the optical lens assembly according to the 1st comparison. The optical lens assembly according to the present disclosure includes certain numbers of reflectance troughs and reflectance crests at a wavelength of 400 nm-700 nm. The reflectance troughs based on the central region of the optical lens element are increasingly defined, in the order from short wavelength to long wavelength, as T1, T2, T3, etc. The reflectance crests based on the central region of the optical lens element are increasingly defined, in the order from short wavelength to long wavelength, as C1, C2, etc.

On the abovementioned basis, the reflectance at the central region and the peripheral region (near the maximum effective diameter region) of the optical lens element can be compared. From FIG. 6, it can be understood that the difference between the reflectance of the central region and the peripheral region of the 1st comparison is too large, and it does not include obvious and equal reflectance troughs and reflectance crests, which cannot be compared. It shows the insufficient coating technique and poor control of coating thickness of the 1st comparison.

The reflectance of the present disclosure is measured from the surface of the optical elements, and the transmittance is measured from the whole optical lens assembly after assembled.

Design of Anti-Reflective Coating and Measurement of Image Quality

The designs of the anti-reflective coatings of the 1st comparison, the 2nd embodiment and the 7th embodiment are shown in Table 16, Table 17 and Table 18 below, respectively.

TABLE 16

Design of Anti-Reflective Coating of 1st Comparison
Physical Vapor Deposition (PVD)

| Order of Coating Layers | Material | Refractive Index | Physical Thickness (nm) |
|---|---|---|---|
| Substrate | Plastic | 1.55 | — |
| 1 | TiO₂ | 2.35 | 14 |
| 2 | SiO₂ | 1.46 | 33 |
| 3 | TiO₂ | 2.35 | 56 |
| 4 | SiO₂ | 1.46 | 9 |

TABLE 16-continued

Design of Anti-Reflective Coating of 1st Comparison
Physical Vapor Deposition (PVD)

| Order of Coating Layers | Material | Refractive Index | Physical Thickness (nm) |
|---|---|---|---|
| 5 | TiO₂ | 2.35 | 42 |
| 6 | SiO₂ | 1.46 | 92 |
| Total Thickness (tTK) | | | 246 |

TABLE 17

Design of Anti-Reflective Coating of 2nd Embodiment
Atomic Layer Deposition (ALD)

| Order of Coating Layers | Material | Refractive Index | Physical Thickness (nm) |
|---|---|---|---|
| Substrate | Plastic | 1.53 | — |
| 1 | TiO₂ | 2.51 | 14 |
| 2 | SiO₂ | 1.46 | 29 |
| 3 | TiO₂ | 2.51 | 67 |
| 4 | SiO₂ | 1.46 | 6 |
| 5 | TiO₂ | 2.51 | 31 |
| 6 | SiO₂ | 1.46 | 90 |
| Total Thickness (tTK) | | | 238 |

TABLE 18

Design of Anti-Reflective Coating of 7th Embodiment
Atomic Layer Deposition (ALD)

| Order of Coating Layers | Material | Refractive Index | Physical Thickness (nm) |
|---|---|---|---|
| Substrate | Plastic | 1.49 | — |
| 1 | Al₂O₃ | 1.21 | 246 |
| Total Thickness (tTK) | | | 246 |

The designs of the anti-reflective coatings of the 2nd embodiment and the 7th embodiment are taken as examples, and the same coating designs or the coating designs with proper modifications can be applied to the optical lens elements of other embodiments. The number of coating layers of the anti-reflective coating, the materials of the optical lens elements, and the high refractive index material and the low refractive index material of the anti-reflective coating can be changed to meet the requirements. The anti-reflective coating can be applied to different optical lens assemblies and to the most suitable optical lens element after evaluating the best arranging factor. The $Al_2O_3$ coating layer at the outer has the refractive index from the outside (air) to the inside (substrate) changing from lower refractive index to higher refractive index in gradient. The effect of the coating layer with refractive index changing in gradient is equivalent to a coating layer with a refractive index, which is about 1.21.

The reference wavelength of the refractive indices in the present disclosure is 510 nm or 587.6 nm.

In addition to the designs of the anti-reflective coatings in Table 17 and Table 18, the designs of the anti-reflective coatings in the present disclosure can also be as follows:

(1) The anti-reflective coating is manufactured by the atomic layer deposit coating technique. The anti-reflective coating can include six coating layers. The materials of the coating layers from the inner of the anti-reflective coating to the outer of the anti-reflective coating are $TiO_2$, $SiO_2$, $TiO_2$, $SiO_2$, $TiO_2$ and $Al_2O_3$, respectively, and the optical lens element including the anti-reflective coating is made of a plastic material.

(2) The anti-reflective coating is manufactured by the atomic layer deposit coating technique. The anti-reflective coating can include eight coating layers. The materials of the coating layers from the inner of the anti-reflective coating to the outer of the anti-reflective coating are $Al_2O_3$, $TiO_2$, $SiO_2$, $TiO_2$, $SiO_2$, $TiO_2$, $SiO_2$ and $Al_2O_3$, respectively, and the optical lens element including the anti-reflective coating is made of a plastic material.

(3) The anti-reflective coating is manufactured by the atomic layer deposit coating technique. The anti-reflective coating can include seven coating layers. The materials of the coating layers from the inner of the anti-reflective coating to the outer of the anti-reflective coating are $Al_2O_3$, $TiO_2$, $SiO_2$, $TiO_2$, $SiO_2$, $TiO_2$ and $SiO_2$, respectively, and the optical lens element including the anti-reflective coating is made of a plastic material.

(4) The anti-reflective coating is manufactured by the atomic layer deposit coating technique. The anti-reflective coating can include two coating layers. The materials of the coating layers from the inner of the anti-reflective coating to the outer of the anti-reflective coating are $Al_2O_3$ and $MgF_2$, respectively, and the optical lens element including the anti-reflective coating is made of a plastic material.

(5) The anti-reflective coating is manufactured by the atomic layer deposit coating technique. The anti-reflective coating can include two coating layers. The materials of the coating layers from the inner of the anti-reflective coating to the outer of the anti-reflective coating are $Al_2O_3$ and $SiO_2$, respectively, and the optical lens element including the anti-reflective coating is made of a plastic material.

(6) The anti-reflective coating is manufactured by the atomic layer deposit coating technique. The anti-reflective coating can include three coating layers. The materials of the coating layers from the inner of the anti-reflective coating to the outer of the anti-reflective coating are $Al_2O_3$, $SiO_2$ and $MgF_2$, respectively, and the optical lens element including the anti-reflective coating is made of a plastic material.

(7) The anti-reflective coating is manufactured by the atomic layer deposit coating technique. The anti-reflective coating can include one coating layer. The material of the coating layer is AlN, and the optical lens element including the anti-reflective coating is made of a plastic material.

The comparison of thicknesses of the anti-reflective coatings at the central regions and the peripheral regions of the optical lens elements of the 1st comparison, the 2nd embodiment and the 7th embodiment is shown in Table 19 below.

TABLE 19

| Thickness of Anti-Reflective Coating | | | | | |
|---|---|---|---|---|---|
| 1st Comparison | | 2nd Embodiment | | 7th Embodiment | |
| Thickness at Central Region (Tc, nm) ZZZ | Thickness at Peripheral Region (Tp, nm) ZZZ | Thickness at Central Region (Tc, nm) ZZZ | Thickness at Peripheral Region (Tp, nm) ZZZ | Thickness at Central Region (Tc, nm) ZZZ | Thickness at Peripheral Region (Tp, nm) ZZZ |
| 246.65 | 208.02 | 245.23 | 244.31 | 246.60 | 243.00 |
| |Tc − Tp|/Tc | | | | | |
| 18.57% | | 0.38% | | 1.48% | |
| Reference Wavelength (nm) | | 510.00 | | 510.00 | |
| Incident Angle (degrees) | | 0 | | 0 | |

Figure 7A:
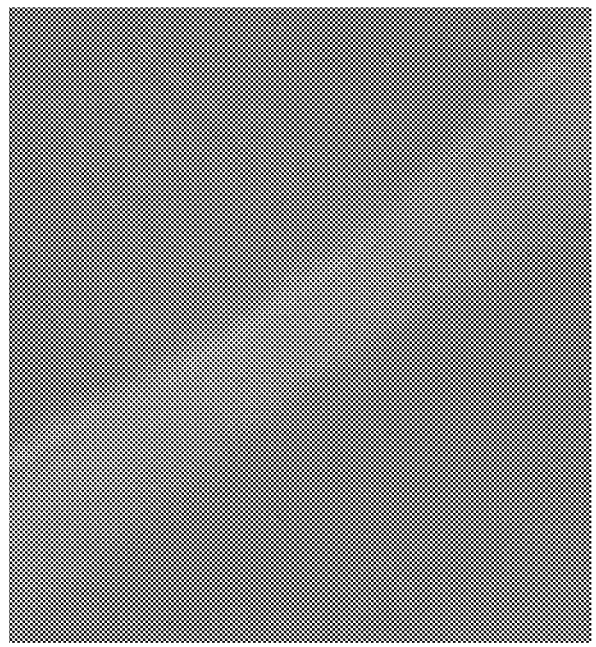
FIG. 7A is a testing figure of image quality from the optical lens assembly of the 1st comparison under a strong incident light at 55 degrees.
Figure 7B:
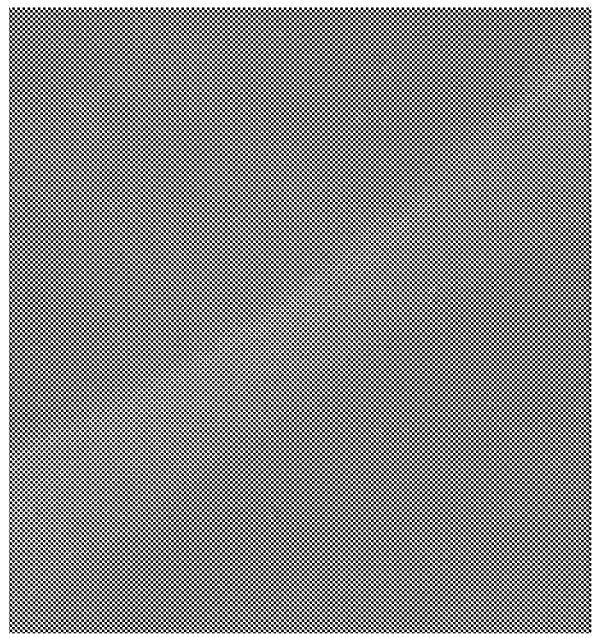
FIG. 7B is a testing figure of image quality from the optical lens assembly of the 2nd embodiment under a strong incident light at 55 degrees.

Please refer to FIG. 7A and FIG. 7B. FIG. 7A is a testing figure of image quality from the optical lens assembly of the 1st comparison under a strong incident light at 55 degrees. FIG. 7B is a testing figure of image quality from the optical lens assembly of the 2nd embodiment under a strong incident light at 55 degrees. The anti-reflective coating of the 2nd embodiment is manufactured by the atomic layer deposit coating technique. From FIG. 7A and FIG. 7B, although there are oblique stripe flares in both of the 1st comparison and the 2nd embodiment, the intensity of the flares in the 2nd embodiment is obviously smaller than the 1st comparison, which means the optical lens assembly of the 2nd embodiment has better imaging quality.

Figure 8B:
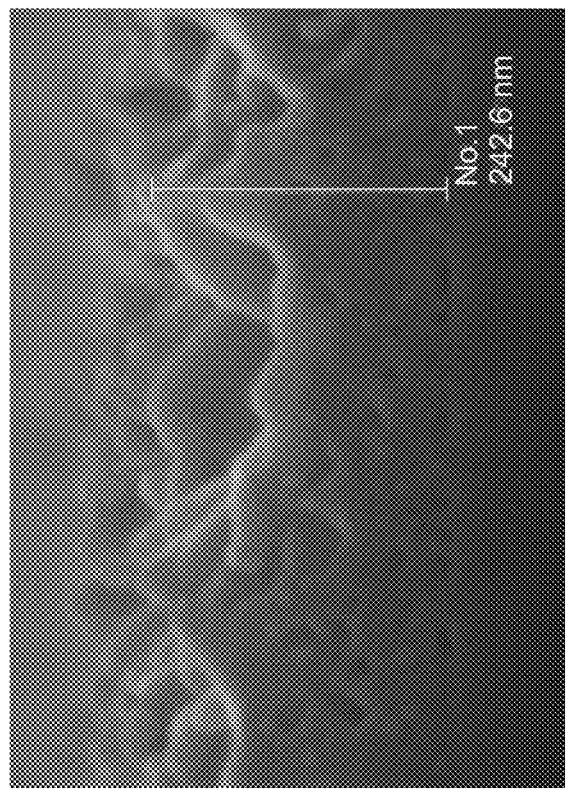
FIG. 8B is a sectional view at the peripheral region of the optical lens element including the anti-reflective coating of the 7th embodiment.
Figure 8A:
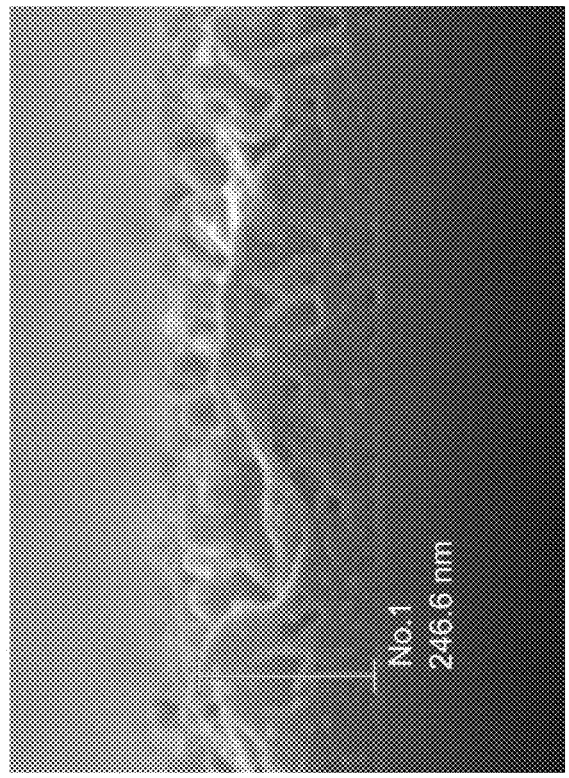
FIG. 8A is a sectional view at the central region of the optical lens element including the anti-reflective coating of the 7th embodiment.

Furthermore, please refer to FIG. 8A and FIG. 8B. FIG. 8A is a sectional view at the central region of the optical lens element including the anti-reflective coating of the 7th embodiment. FIG. 8B is a sectional view at the peripheral region of the optical lens element including the anti-reflective coating of the 7th embodiment. FIG. 8A and FIG. 8B show that the pores at the outer side of the anti-reflective coating are relatively larger than the pores at the inner side thereof, which means the density of the irregular branch-like nanofiber structure at the outer side of the anti-reflective coating is lower, and the density of the irregular branch-like nanofiber structure at the inner side thereof is higher in the same plane.

13th Embodiment

The anti-reflective element of the optical lens assembly according to the 13th embodiment can include at least one filtering element or a cover glass, which are a filtering element F1, a filtering element F2, a filtering element F3, a filtering element F4, a filtering element F5, a filtering element F6 or a cover glass G1, respectively. The parameter values of each of the filtering elements and cover glass which are selectable included in the optical lens assembly according to the 13th embodiment are shown in Table 20 below. The definitions of these parameters shown in the following table are the same as those stated in the 1st embodiment with corresponding values for the 13th embodiment, so an explanation in this regard will not be provided again.

TABLE 20

Optical Lens Assembly of 13th Embodiment

| | F1 | F2 | F3 | F4 | F5 | F6 | G1 |
|---|---|---|---|---|---|---|---|
| CTs | 0.55 | 0.30 | 0.20 | 0.55 | 0.30 | 0.20 | 0.55 |
| Ns (at wavelength of 587.6 nm) | 1.53 | 1.53 | 1.62 | 1.69 | 1.77 | 1.82 | 1.92 |
| Far3 = $(1/(Ns - 1))^2$ | 3.501 | 3.570 | 2.601 | 2.100 | 1.687 | 1.487 | 1.181 |

The two designs of the anti-reflective coating of the 13th embodiment are shown in Table 21 and Table 22 below, respectively.

TABLE 21

One Design of Anti-Reflective Coating of 13th Embodiment

| Order of Coating Layers | Material | Refractive Index | Physical Thickness (nm) |
|---|---|---|---|
| Substrate | Glass/Plastic | 1.53-1.92 | — |
| 1 | SiO$_2$ | 1.46 (N1) | 21 |
| 2 | TiO$_2$ | 2.35 (N2) | 9 |
| 3 | SiO$_2$ | 1.46 (N3) | 48 |
| 4 | TiO$_2$ | 2.35 (N4) | 4 |
| 5 | SiO$_2$ | 1.46 (N5) | 65 |
| 6 | Al$_2$O$_3$ | 1.21 (N6) | 120 |
| Total Thickness (tTK) | | | 267 |

TABLE 22

Another Design of Anti-Reflective Coating of 13th Embodiment

| Order of Coating Layers | Material | Refractive Index | Physical Thickness (nm) |
|---|---|---|---|
| Substrate | Glass/Plastic | 1.53-1.92 | — |
| 1 | SiO$_2$ | 1.46 (N1) | 100 |
| 2 | Al$_2$O$_3$ | 1.21 (N2) | 115 |
| Total Thickness (tTK) | | | 215 |

In the anti-reflective coating of the present disclosure, the coating layer closest to the substrate is the first coating layer, and the remaining coating layers are the second coating layer, the third coating layer, etc., sequentially. The second coating layer is in contact with the first coating layer, and so on. The refractive index of the first coating layer is N1, the refractive index of the second coating layer is N2, and so on.

In one design of the anti-reflective coating of the 13th embodiment, the substrate is made of glass or plastic. The refractive index of the substrate is 1.53-1.92. The thickness of the substrate is 0.20 mm, 0.30 mm or 0.55 mm. The first coating layer is made of SiO$_2$, the refractive index of the first coating layer is 1.46, and the thickness of the first coating layer is 21 nm. The second coating layer is made of TiO$_2$, the refractive index of the second coating layer is 2.35, and the thickness of the second coating layer is 9 nm. The third coating layer is made of SiO$_2$, the refractive index of the third coating layer is 1.46, and the thickness of the third coating layer is 48 nm. The fourth coating layer is made of TiO$_2$, the refractive index of the fourth coating layer is 2.35, and the thickness of the fourth coating layer is 4 nm. The fifth coating layer is made of SiO$_2$, the refractive index of the fifth coating layer is 1.46, and the thickness of the fifth coating layer is 65 nm. The sixth coating layer is made of Al$_2$O$_3$. The refractive index of the sixth coating layer is gradient and is equivalent to 1.21. The thickness of the sixth coating layer is 120 nm. The refractive index of the sixth coating layer is equivalently smaller than the refractive indices of the first coating layer, the second coating layer, the third coating layer, the fourth coating layer, the fifth coating layer and the substrate. The refractive index of the fifth coating layer is smaller than the refractive index of the fourth coating layer. The refractive index of the fourth coating layer is larger than the refractive index of the third coating layer. The refractive index of the third coating layer is smaller than the refractive index of the second coating layer. The refractive index of the second coating layer is larger than the refractive index of the first coating layer. The refractive index of the first coating layer is smaller than the refractive index of the substrate.

In another design of the anti-reflective coating of the 13th embodiment, the substrate is made of glass or plastic. The refractive index of the substrate is 1.53-1.92. The thickness of the substrate is 0.20 mm, 0.30 mm or 0.55 mm. The first coating layer is made of SiO$_2$, the refractive index of the first coating layer is 1.46, and the thickness of the first coating layer is 100 nm. The second coating layer is made of Al$_2$O$_3$. The refractive index of the second coating layer is gradient and is equivalent to 1.21. The thickness of the second coating layer is 115 nm. The refractive index of the second coating layer is equivalently smaller than the refractive indices of the first coating layer and the substrate. The refractive index of the first coating layer is smaller than the refractive index of the substrate.

Figure 9B:
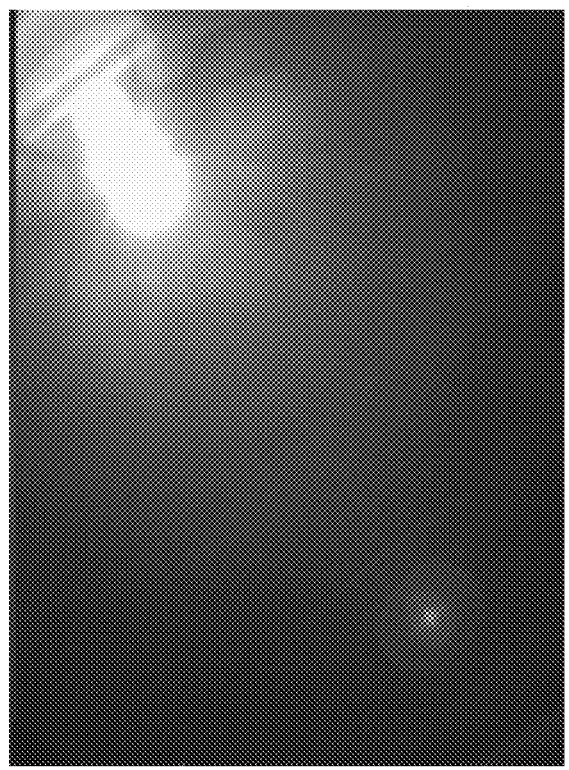
FIG. 9B is a testing figure of image quality from the optical lens assembly of the 13th embodiment under a strong incident light at large angle.
Figure 9A:
FIG. 9A is a testing figure of image quality from the optical lens assembly of the 1st comparison under a strong incident light at large angle.

Please refer to FIG. 9A and FIG. 9B. FIG. 9A is a testing figure of image quality from the optical lens assembly of the 1st comparison under a strong incident light at large angle (19 degrees). FIG. 9B is a testing figure of image quality from the optical lens assembly of the 13th embodiment under a strong incident light at large angle (19 degrees). From FIG. 9A and FIG. 9B, there are obvious stray lights at the corner of the image of the 1st comparison, while there are no obvious stray lights at the corner of the image of the 13th embodiment. It shows that the problem of stray lights at the corner can be effectively improved in the optical lens assembly of the 13th embodiment under a strong light at large angle.

Figure 10B:
FIG. 10B is a testing figure of image quality from the micro lens of the 13th embodiment.
Figure 10A:
FIG. 10A is a testing figure of image quality from the micro lens of the 1st comparison.

Furthermore, please refer to FIG. 10A and FIG. 10B. FIG. 10A is a testing figure of image quality from the micro lens of the 1st comparison. FIG. 10B is a testing figure of image quality from the micro lens of the 13th embodiment. From FIG. 10A and FIG. 10B, there are obvious stray lights with petal shapes in the 1st comparison, where there are no stray lights with petal shapes in the 13th embodiment. It shows that the problem of stray lights with petal shapes can be significantly improved in the optical lens assembly of the 13th embodiment.

Measurement of Reflectance and Transmittance

The results of reflectance of the 2nd comparison, the 14th embodiment and the 15th embodiment are shown in Table 23 and Table 24 below.

TABLE 23

Reflectance Results of 2nd Comparison, 14th Embodiment and 15th Embodiment

|  | 2nd Comparison | 14th Embodiment | 15th Embodiment |
|---|---|---|---|
| Combination | Anti-Reflective Element | Anti-Reflective Element | Anti-Reflective Element |
| First Surface of Anti-Reflective Element | IR-Cut Filter | IR-Cut Filter | IR-Cut Filter and Anti-Reflective Coating of Present Disclosure |
| Second Surface of Anti-Reflective Element | Conventional Anti-Reflective Coating | Anti-Reflective Coating of Present Disclosure | Anti-Reflective Coating of Present Disclosure |
| WRmin (nm) | 510 | 580 | 585 |
| Reflectance (%) | | | |
| R4060 | 1.4 | 0.2 | 0.1 |
| R4063 | 1.4 | 0.2 | 0.1 |
| R4065 | 1.4 | 0.2 | 0.1 |
| R40100 | 2.4 | 0.8 | 0.7 |
| R5060 | 1.3 | 0.2 | 0.1 |
| R6070 | 1.9 | 0.5 | 0.4 |
| R67100 | 3.1 | 1.3 | 1.2 |
| R70100 | 3.2 | 1.3 | 1.3 |
| R80100 | 3.4 | 1.5 | 1.4 |
| R90100 | 3.5 | 1.6 | 1.5 |
| R50 | 1.3 | 0.2 | 0.1 |
| R60 | 1.4 | 0.1 | 0.0 |
| R65 | 1.7 | 0.5 | 0.5 |
| R70 | 2.5 | 0.9 | 0.8 |
| R80 | 3.0 | 1.2 | 1.1 |
| R90 | 3.4 | 1.5 | 1.4 |
| R100 | 3.7 | 1.8 | 1.7 |

TABLE 24

Reflectance Results of Anti-Reflective Elements of 2nd Comparison, 14th Embodiment and 15th Embodiment

| Wavelength (nm) | 2nd Comparison | 14th Embodiment | 15th Embodiment |
|---|---|---|---|
| 400 | 2.0 | 0.0 | 0.0 |
| 405 | 1.7 | 0.3 | 0.2 |
| 410 | 1.8 | 0.2 | 0.1 |
| 415 | 1.8 | 0.2 | 0.0 |
| 420 | 1.7 | 0.3 | 0.2 |
| 425 | 1.7 | 0.2 | 0.1 |
| 430 | 1.5 | 0.1 | 0.0 |
| 435 | 1.4 | 0.1 | 0.0 |
| 440 | 1.5 | 0.3 | 0.1 |
| 445 | 1.6 | 0.2 | 0.1 |
| 450 | 1.4 | 0.1 | 0.0 |
| 455 | 1.5 | 0.4 | 0.2 |
| 460 | 1.3 | 0.2 | 0.1 |
| 465 | 1.3 | 0.2 | 0.1 |

TABLE 24-continued

Reflectance Results of Anti-Reflective Elements of 2nd Comparison, 14th Embodiment and 15th Embodiment

| Wavelength (nm) | 2nd Comparison | 14th Embodiment | 15th Embodiment |
|---|---|---|---|
| 470 | 1.3 | 0.2 | 0.0 |
| 475 | 1.3 | 0.2 | 0.0 |
| 480 | 1.4 | 0.2 | 0.0 |
| 485 | 1.3 | 0.2 | 0.1 |
| 490 | 1.3 | 0.2 | 0.1 |
| 495 | 1.3 | 0.2 | 0.1 |
| 500 | 1.3 | 0.2 | 0.1 |
| 505 | 1.3 | 0.2 | 0.1 |
| 510 | 1.3 | 0.2 | 0.1 |
| 515 | 1.3 | 0.2 | 0.1 |
| 520 | 1.3 | 0.2 | 0.1 |
| 525 | 1.3 | 0.2 | 0.1 |
| 530 | 1.3 | 0.2 | 0.1 |
| 535 | 1.3 | 0.1 | 0.1 |
| 540 | 1.3 | 0.2 | 0.1 |
| 545 | 1.3 | 0.2 | 0.1 |
| 550 | 1.3 | 0.1 | 0.0 |
| 555 | 1.3 | 0.2 | 0.1 |
| 560 | 1.3 | 0.2 | 0.0 |
| 565 | 1.3 | 0.1 | 0.1 |
| 570 | 1.4 | 0.1 | 0.1 |
| 575 | 1.4 | 0.1 | 0.1 |
| 580 | 1.4 | 0.1 | 0.1 |
| 585 | 1.4 | 0.1 | 0.0 |
| 590 | 1.4 | 0.1 | 0.0 |
| 595 | 1.4 | 0.2 | 0.1 |
| 600 | 1.4 | 0.1 | 0.0 |
| 605 | 1.4 | 0.1 | 0.0 |
| 610 | 1.4 | 0.1 | 0.0 |
| 615 | 1.4 | 0.1 | 0.0 |
| 620 | 1.5 | 0.1 | 0.0 |
| 625 | 1.5 | 0.1 | 0.0 |
| 630 | 1.5 | 0.1 | 0.0 |
| 635 | 1.5 | 0.1 | 0.0 |
| 640 | 1.5 | 0.2 | 0.1 |
| 645 | 1.6 | 0.3 | 0.2 |
| 650 | 1.7 | 0.5 | 0.5 |
| 655 | 2.0 | 0.7 | 0.7 |
| 660 | 2.2 | 0.8 | 0.8 |
| 665 | 2.3 | 0.8 | 0.8 |
| 670 | 2.3 | 0.8 | 0.8 |
| 675 | 2.4 | 0.9 | 0.8 |
| 680 | 2.4 | 0.9 | 0.8 |
| 685 | 2.4 | 0.9 | 0.8 |
| 690 | 2.5 | 0.9 | 0.8 |
| 695 | 2.5 | 0.9 | 0.8 |
| 700 | 2.5 | 0.9 | 0.8 |
| 705 | 2.6 | 0.9 | 0.9 |
| 710 | 2.6 | 0.9 | 0.9 |
| 715 | 2.6 | 1.0 | 0.9 |
| 720 | 2.7 | 1.0 | 0.9 |
| 725 | 2.7 | 1.0 | 1.0 |
| 730 | 2.7 | 1.0 | 0.9 |
| 735 | 2.8 | 1.0 | 1.0 |
| 740 | 2.8 | 1.1 | 1.0 |
| 745 | 2.8 | 1.1 | 1.0 |
| 750 | 2.8 | 1.1 | 1.0 |
| 755 | 2.9 | 1.1 | 1.0 |
| 760 | 2.9 | 1.1 | 1.1 |
| 765 | 2.9 | 1.1 | 1.1 |
| 770 | 2.9 | 1.1 | 1.1 |
| 775 | 2.9 | 1.1 | 1.1 |
| 780 | 3.0 | 1.2 | 1.1 |
| 785 | 3.0 | 1.2 | 1.1 |
| 790 | 3.0 | 1.2 | 1.1 |
| 795 | 3.0 | 1.2 | 1.1 |
| 800 | 3.0 | 1.2 | 1.1 |
| 805 | 3.1 | 1.2 | 1.1 |
| 810 | 3.1 | 1.2 | 1.2 |
| 815 | 3.1 | 1.2 | 1.2 |
| 820 | 3.1 | 1.3 | 1.2 |
| 825 | 3.1 | 1.3 | 1.2 |
| 830 | 3.2 | 1.3 | 1.2 |
| 835 | 3.2 | 1.3 | 1.2 |

TABLE 24-continued

Reflectance Results of Anti-Reflective Elements of
2nd Comparison, 14th Embodiment and 15th Embodiment

| Wavelength (nm) | 2nd Comparison | 14th Embodiment | 15th Embodiment |
|---|---|---|---|
| 840 | 3.2 | 1.3 | 1.2 |
| 845 | 3.3 | 1.4 | 1.3 |
| 850 | 3.2 | 1.3 | 1.3 |
| 855 | 3.2 | 1.3 | 1.3 |
| 860 | 3.3 | 1.4 | 1.3 |
| 865 | 3.3 | 1.4 | 1.3 |
| 870 | 3.3 | 1.4 | 1.3 |
| 875 | 3.3 | 1.4 | 1.3 |
| 880 | 3.4 | 1.4 | 1.4 |
| 885 | 3.4 | 1.5 | 1.4 |
| 890 | 3.3 | 1.4 | 1.4 |
| 895 | 3.4 | 1.5 | 1.4 |
| 900 | 3.4 | 1.5 | 1.4 |
| 905 | 3.4 | 1.5 | 1.4 |
| 910 | 3.5 | 1.5 | 1.4 |
| 915 | 3.4 | 1.5 | 1.5 |
| 920 | 3.5 | 1.6 | 1.5 |
| 925 | 3.5 | 1.6 | 1.5 |
| 930 | 3.5 | 1.6 | 1.5 |
| 935 | 3.5 | 1.6 | 1.5 |
| 940 | 3.5 | 1.6 | 1.5 |
| 945 | 3.6 | 1.6 | 1.5 |
| 950 | 3.5 | 1.6 | 1.5 |
| 955 | 3.5 | 1.7 | 1.6 |
| 960 | 3.6 | 1.7 | 1.5 |
| 965 | 3.6 | 1.7 | 1.6 |
| 970 | 3.6 | 1.6 | 1.6 |
| 975 | 3.7 | 1.7 | 1.5 |
| 980 | 3.6 | 1.7 | 1.6 |
| 985 | 3.6 | 1.7 | 1.6 |
| 990 | 3.7 | 1.7 | 1.7 |
| 995 | 3.6 | 1.7 | 1.7 |
| 1000 | 3.7 | 1.8 | 1.7 |

Figure 11:
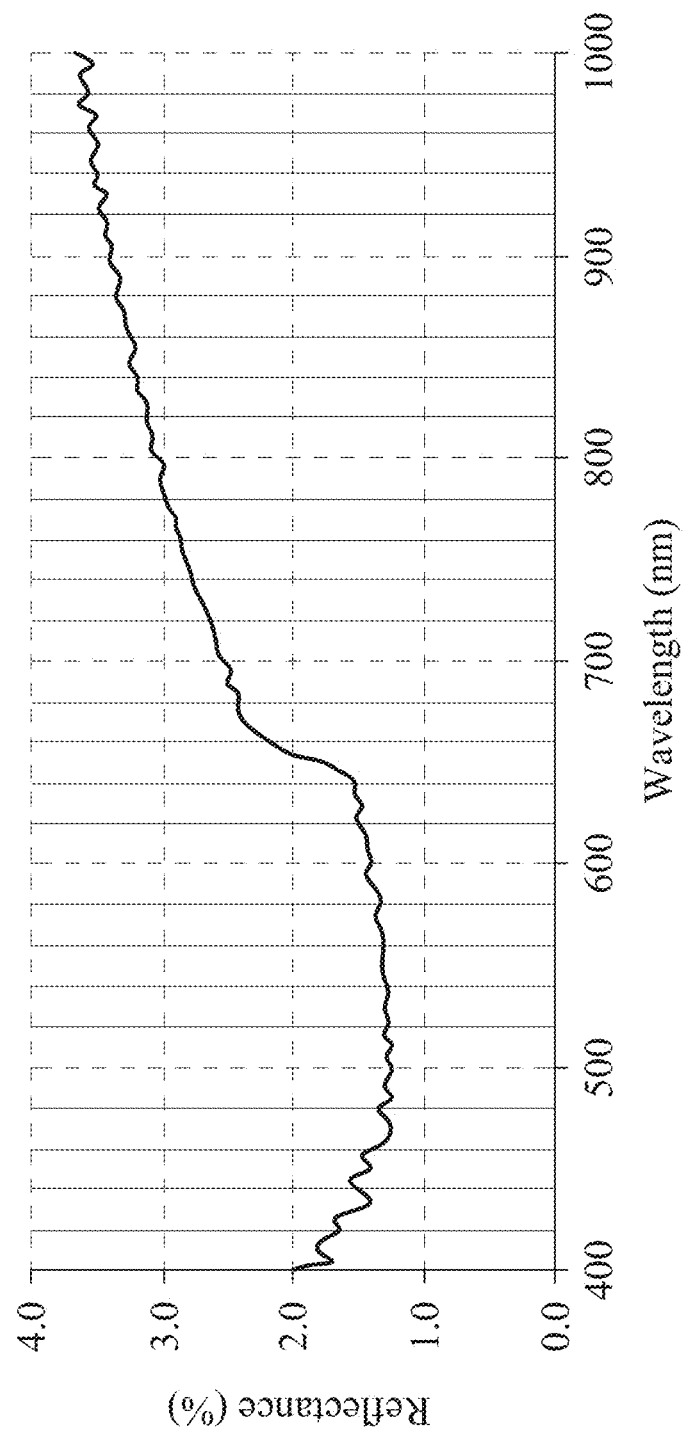
FIG. 11 is a relationship diagram of reflectance and wavelength of the anti-reflective element according to the 2nd comparison.
Figure 12:
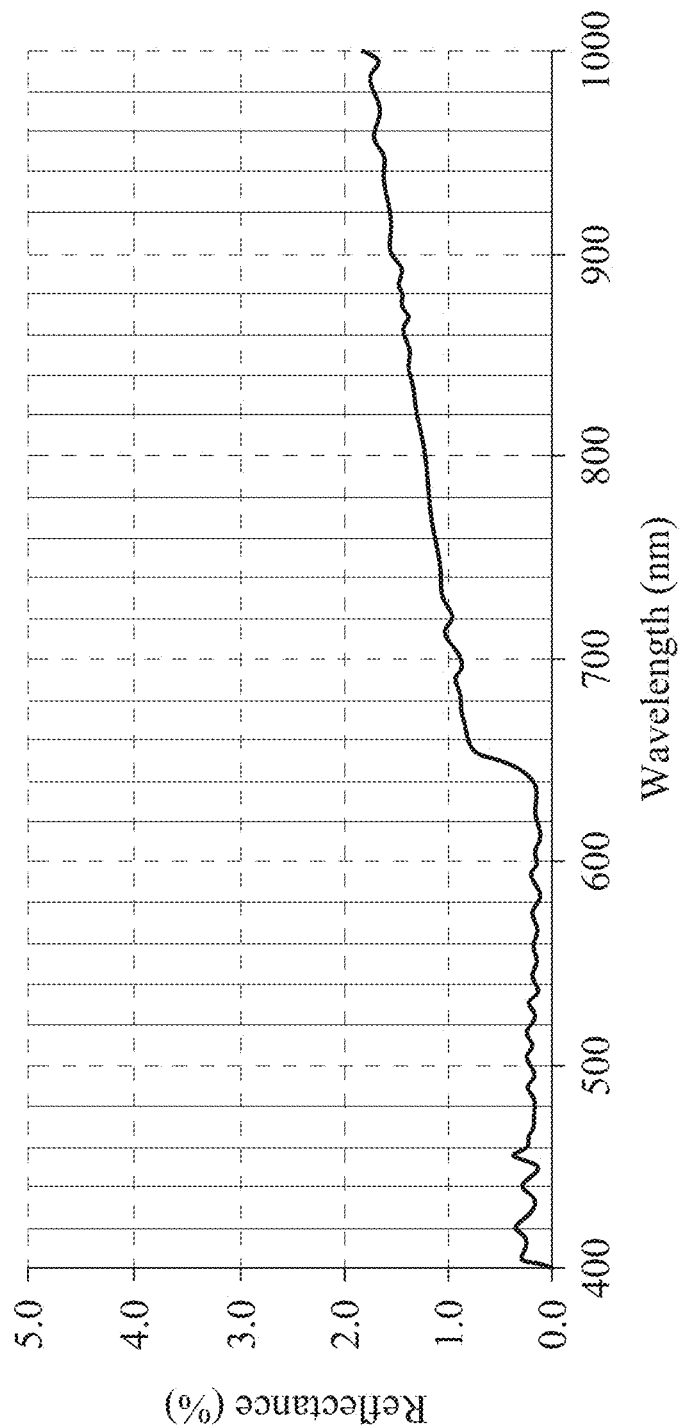
FIG. 12 is a relationship diagram of reflectance and wavelength of the anti-reflective element according to the 14th embodiment.
Figure 13:
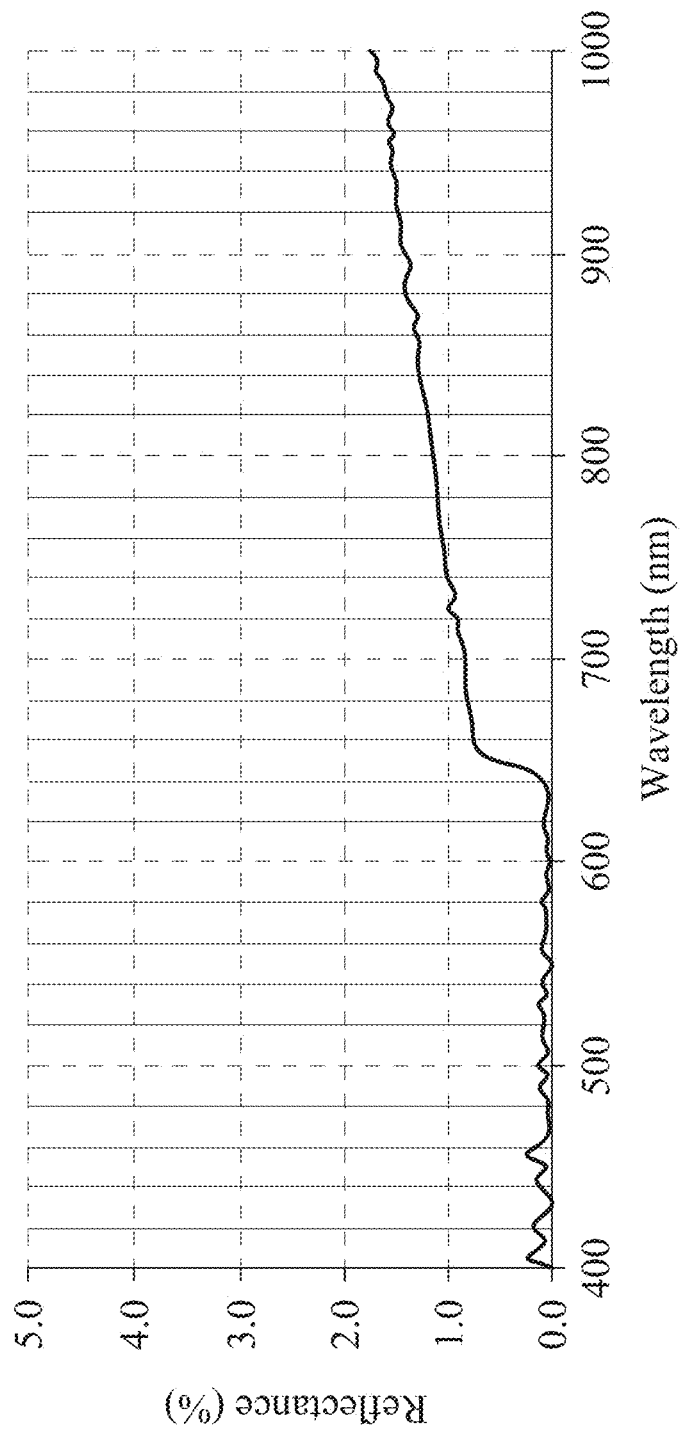
FIG. 13 is a relationship diagram of reflectance and wavelength of the anti-reflective element according to the 15th embodiment.

Please refer to FIG. 11 to FIG. 13. FIG. 11 is a relationship diagram of reflectance and wavelength of the anti-reflective element according to the 2nd comparison. FIG. 12 is a relationship diagram of reflectance and wavelength of the anti-reflective element according to the 14th embodiment. FIG. 13 is a relationship diagram of reflectance and wavelength of the anti-reflective element according to the 15th embodiment. From FIG. 11 to FIG. 13, the reflectance of the 14th embodiment and the 15th embodiment is obviously smaller than the reflectance of the 2nd comparison, which means the excellent anti-reflective effect can be obtained by adopting different coating method in the 14th embodiment and the 15th embodiment.

The results of transmittance of the 2nd comparison and the 14th embodiment are shown in Table 25 and Table 26 below.

TABLE 25

Transmittance Results of 2nd Comparison and 14th Embodiment

| | 2nd Comparison | 14th Embodiment |
|---|---|---|
| Combination | Anti-Reflective Element IR-Cut Filter | Anti-Reflective Element IR-Cut Filter |
| First Surface of Anti-Reflective Element | | |
| Second Surface of Anti-Reflective Element | Conventional Anti-Reflective Coating | Anti-Reflective Coating of Present Disclosure |
| | Transmittance (%) | |
| Tmax | 98 | 100 |
| T4060 | 95 | 99 |
| T5060 | 98 | 100 |
| T70100 | 0.16 | 0.15 |
| T40 | 38 | 94 |
| T50 | 98 | 99 |
| T60 | 98 | 99 |
| T70 | 0.43 | 0.14 |

TABLE 26

Transmittance Results of Anti-Reflective Elements
of 2nd Comparison and 14th Embodiment

| Wavelength (nm) | 2nd Comparison | 14th Embodiment |
|---|---|---|
| 400 | 38.0 | 93.8 |
| 405 | 73.0 | 96.2 |
| 410 | 91.1 | 97.5 |
| 415 | 94.7 | 98.2 |
| 420 | 96.2 | 98.7 |
| 425 | 96.8 | 98.7 |
| 430 | 97.2 | 98.3 |
| 435 | 97.0 | 97.6 |
| 440 | 97.1 | 97.9 |
| 445 | 97.7 | 98.7 |
| 450 | 97.8 | 99.4 |
| 455 | 98.0 | 99.5 |
| 460 | 98.2 | 99.5 |
| 465 | 98.0 | 99.4 |
| 470 | 98.2 | 99.3 |
| 475 | 98.3 | 99.3 |
| 480 | 98.2 | 99.2 |
| 485 | 98.3 | 99.5 |
| 490 | 97.9 | 99.4 |
| 495 | 97.7 | 99.4 |
| 500 | 97.9 | 99.4 |
| 505 | 97.7 | 99.3 |
| 510 | 97.1 | 99.5 |
| 515 | 97.0 | 99.7 |
| 520 | 97.2 | 99.7 |
| 525 | 97.5 | 99.8 |
| 530 | 97.7 | 99.9 |
| 535 | 97.9 | 99.9 |
| 540 | 97.7 | 100.0 |
| 545 | 97.7 | 100.0 |
| 550 | 97.9 | 100.0 |
| 555 | 98.3 | 100.0 |
| 560 | 98.2 | 100.0 |
| 565 | 97.3 | 99.7 |
| 570 | 96.8 | 99.4 |
| 575 | 97.5 | 99.4 |
| 580 | 98.0 | 99.6 |
| 585 | 98.2 | 99.8 |
| 590 | 98.0 | 99.7 |
| 595 | 97.9 | 99.4 |
| 600 | 98.0 | 99.4 |
| 605 | 98.2 | 99.1 |
| 610 | 98.0 | 99.0 |
| 615 | 98.0 | 98.5 |
| 620 | 97.7 | 97.5 |
| 625 | 96.9 | 96.6 |
| 630 | 96.5 | 96.8 |
| 635 | 96.4 | 97.3 |
| 640 | 96.1 | 94.6 |
| 645 | 93.2 | 79.1 |
| 650 | 79.1 | 49.3 |
| 655 | 47.2 | 19.9 |
| 660 | 18.9 | 6.6 |
| 665 | 7.0 | 3.0 |
| 670 | 3.5 | 1.8 |
| 675 | 2.2 | 1.3 |
| 680 | 1.5 | 0.9 |
| 685 | 1.1 | 0.5 |
| 690 | 0.8 | 0.3 |

TABLE 26-continued

Transmittance Results of Anti-Reflective Elements
of 2nd Comparison and 14th Embodiment

| Wavelength (nm) | 2nd Comparison | 14th Embodiment |
|---|---|---|
| 695 | 0.6 | 0.2 |
| 700 | 0.4 | 0.1 |
| 705 | 0.4 | 0.1 |
| 710 | 0.3 | 0.1 |
| 715 | 0.2 | 0.1 |
| 720 | 0.2 | 0.1 |
| 725 | 0.1 | 0.1 |
| 730 | 0.1 | 0.1 |
| 735 | 0.2 | 0.1 |
| 740 | 0.2 | 0.1 |
| 745 | 0.2 | 0.1 |
| 750 | 0.2 | 0.1 |
| 755 | 0.1 | 0.1 |
| 760 | 0.1 | 0.1 |
| 765 | 0.1 | 0.1 |
| 770 | 0.1 | 0.1 |
| 775 | 0.1 | 0.1 |
| 780 | 0.1 | 0.1 |
| 785 | 0.1 | 0.1 |
| 790 | 0.1 | 0.1 |
| 795 | 0.1 | 0.1 |
| 800 | 0.1 | 0.1 |
| 805 | 0.1 | 0.1 |
| 810 | 0.1 | 0.1 |
| 815 | 0.1 | 0.1 |
| 820 | 0.1 | 0.1 |
| 825 | 0.1 | 0.1 |
| 830 | 0.2 | 0.1 |
| 835 | 0.1 | 0.2 |
| 840 | 0.2 | 0.3 |
| 845 | 0.2 | 0.3 |
| 850 | 0.4 | 0.3 |
| 855 | 0.3 | 0.2 |
| 860 | 0.2 | 0.1 |
| 865 | 0.1 | 0.2 |
| 870 | 0.4 | 0.1 |
| 875 | 0.0 | 0.2 |
| 880 | 0.3 | 0.3 |
| 885 | 0.3 | 0.1 |
| 890 | 0.1 | 0.2 |
| 895 | 0.3 | 0.4 |
| 900 | 0.1 | 0.3 |
| 905 | 0.2 | 0.3 |
| 910 | 0.3 | 0.2 |
| 915 | 0.2 | 0.2 |
| 920 | 0.1 | 0.2 |
| 925 | 0.0 | 0.2 |
| 930 | 0.3 | 0.1 |
| 935 | 0.1 | 0.1 |
| 940 | 0.1 | 0.1 |
| 945 | 0.1 | 0.1 |
| 950 | −0.1 | 0.1 |
| 955 | 0.1 | 0.2 |
| 960 | 0.1 | 0.2 |
| 965 | 0.2 | 0.3 |
| 970 | 0.1 | 0.4 |
| 975 | 0.1 | 0.4 |
| 980 | 0.1 | 0.3 |
| 985 | 0.2 | 0.1 |
| 990 | 0.0 | 0.3 |
| 995 | 0.1 | 0.2 |
| 1000 | 0.0 | 0.1 |

Figure 14:
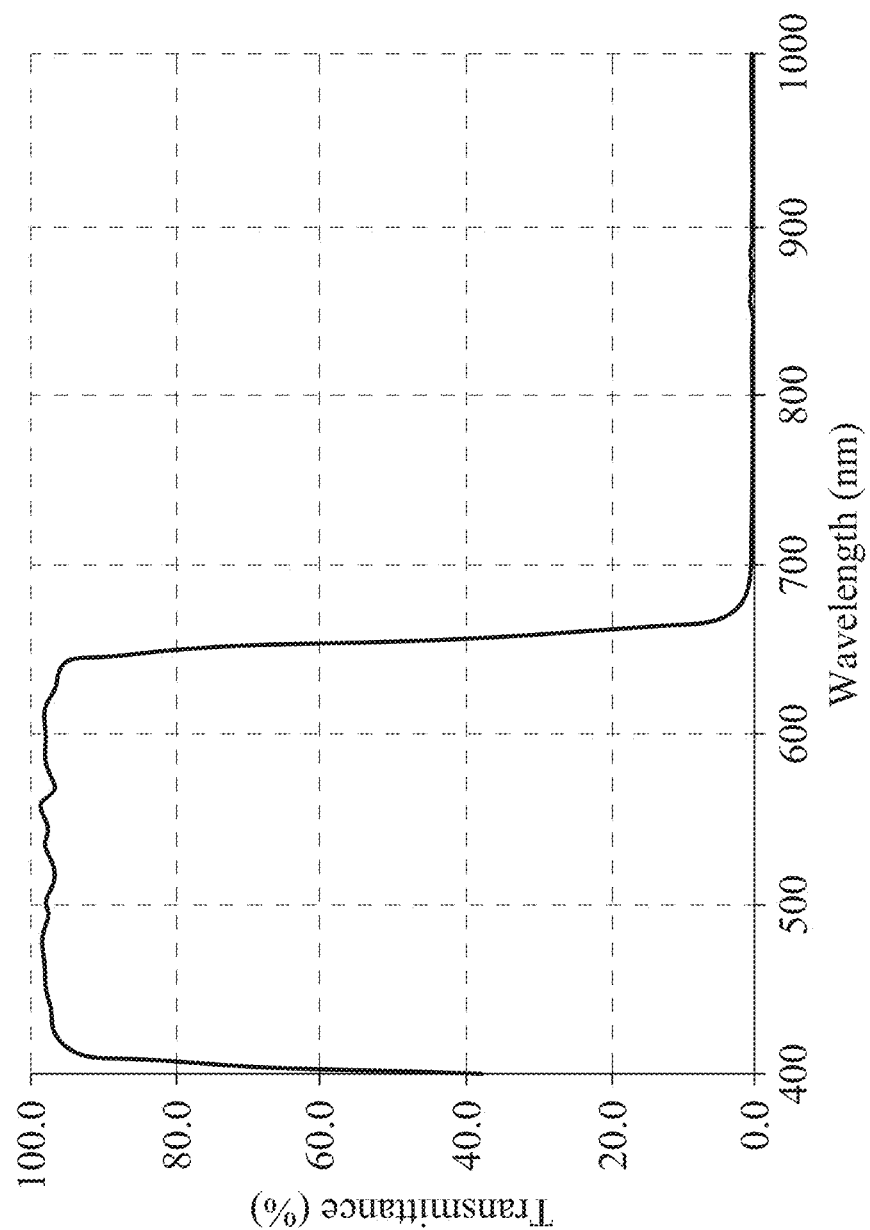
FIG. 14 is a relationship diagram of transmittance and wavelength of the anti-reflective element according to the 2nd comparison.
Figure 15:
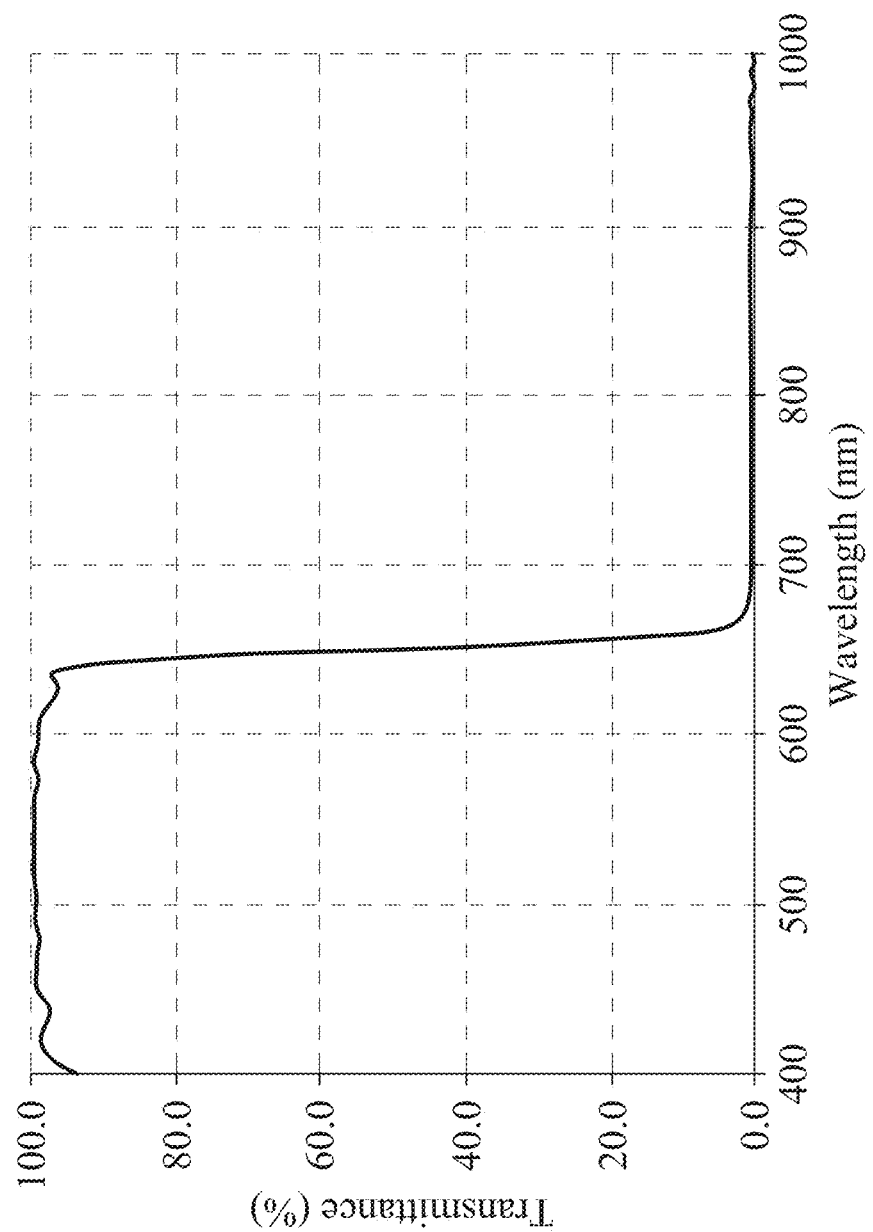
FIG. 15 is a relationship diagram of transmittance and wavelength of the anti-reflective element according to the 14th embodiment.

Please refer to FIG. 14 and FIG. 15. FIG. 14 is a relationship diagram of transmittance and wavelength of the anti-reflective element according to the 2nd comparison. FIG. 15 is a relationship diagram of transmittance and wavelength of the anti-reflective element according to the 14th embodiment. From FIG. 14 and FIG. 15, the transmittances of the 14th embodiment and the 2nd comparison at different wavelengths are similar, which means that great transmittance remains at short wavelengths and great filtering effect is obtained at long wavelengths in the 14th embodiment.

15th Embodiment

Figure 16:
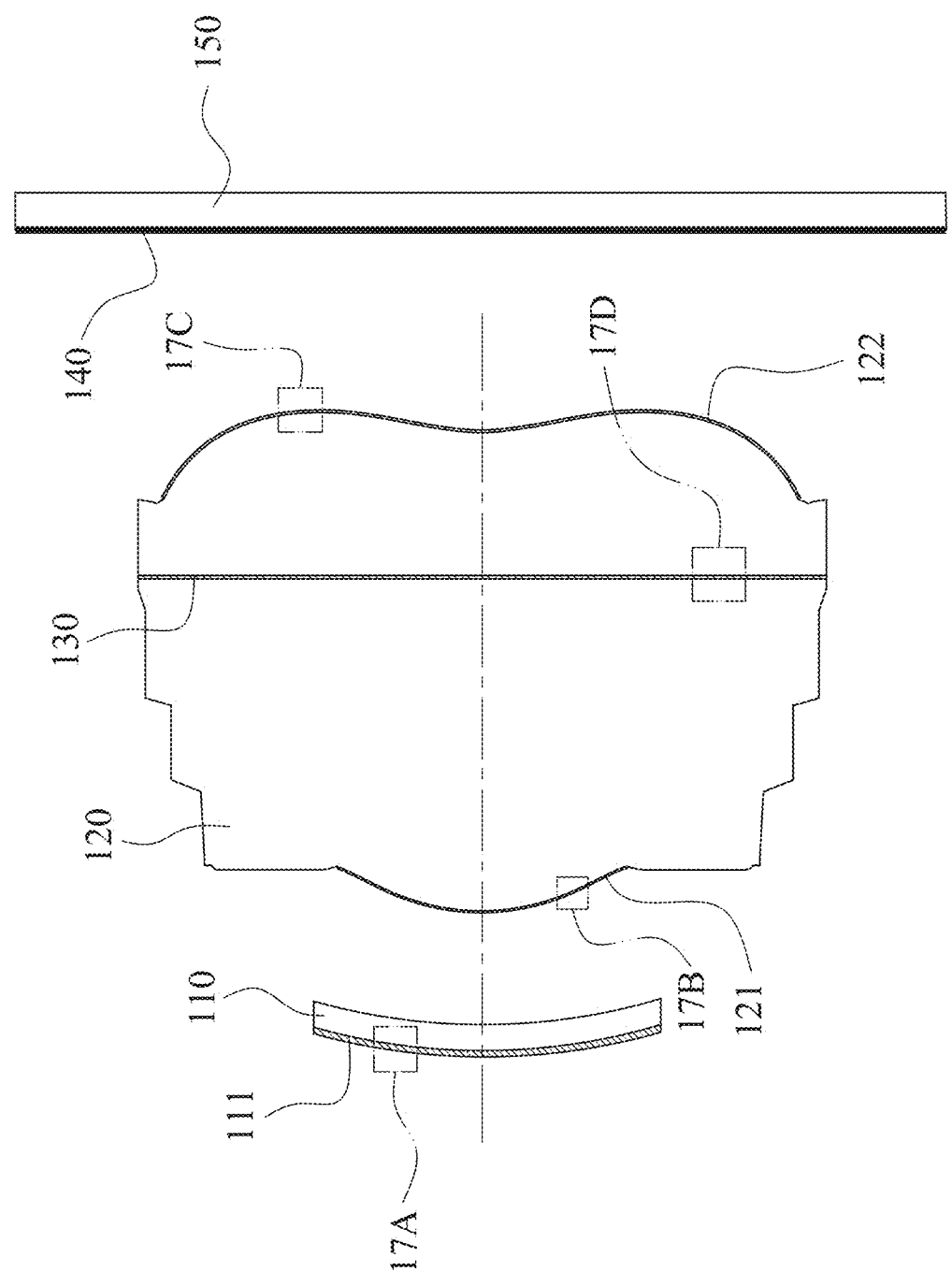
FIG. 16 is a schematic view of an imaging apparatus according to one example of the present disclosure.

Please refer to FIG. 16. FIG. 16 is a schematic view of an imaging apparatus according to one example of the present disclosure. The imaging apparatus according to the 15th embodiment includes, from an object side to an image side, a curved lens element 110, an optical lens assembly 120 and an image sensor 150. The image sensor 150 is disposed on an image surface 140 of the optical lens assembly 120.

Figure 17A:
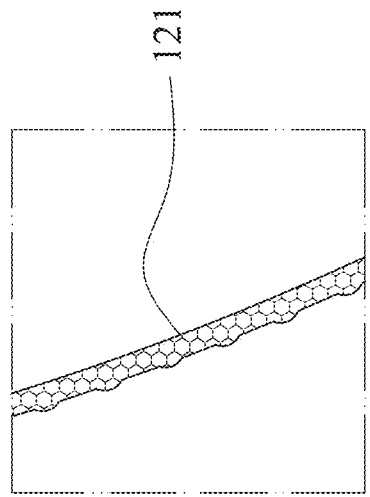
FIG. 17A is a partially enlarged view at the 17A position of the imaging apparatus of FIG. 16.
Figure 17B:
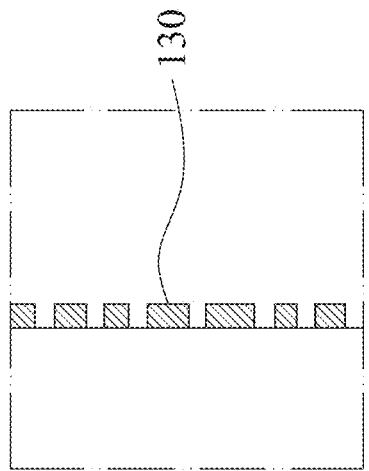
FIG. 17B is a partially enlarged view at the 17B position of the imaging apparatus of FIG. 16.
Figure 17C:
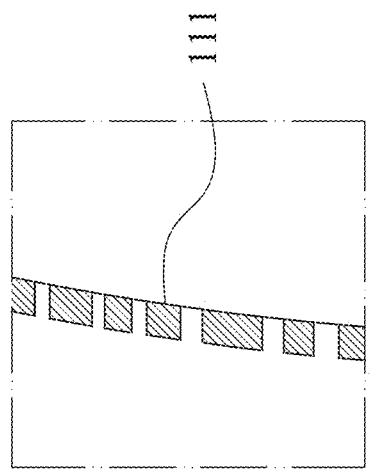
FIG. 17C is a partially enlarged view at the 17C positions of the imaging apparatus of FIG. 16 and the Fresnel lens element of FIG. 18.
Figure 17D:
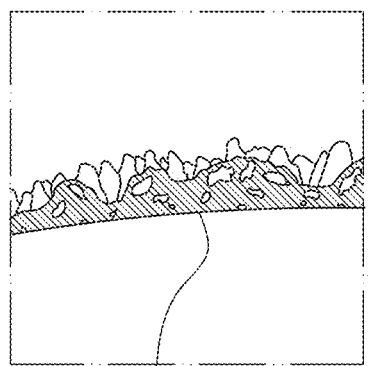
FIG. 17D is a partially enlarged view at the 17D position of the imaging apparatus of FIG. 16.

Please refer to FIG. 17A to FIG. 17D. FIG. 17A, FIG. 17B, FIG. 17C and FIG. 17D are partially enlarged views at the 17A position, the 17B position, the 17C position and the 17D position of the imaging apparatus of FIG. 16, respectively. An object-side surface 111 of the curved lens element 110 includes a meta lens structure, which has the detailed structure as shown in FIG. 17A. An object-side surface 121 of the optical lens assembly 120 includes a graphene structure, which has the detailed structure as shown in FIG. 17B. An image-side surface 122 of the optical lens assembly 120 includes an anti-reflective coating, which has the detailed structure as shown in FIG. 17C. The imaging apparatus can further include a meta lens structure 130, which has the detailed structure as shown in FIG. 17D.

Figure 18:
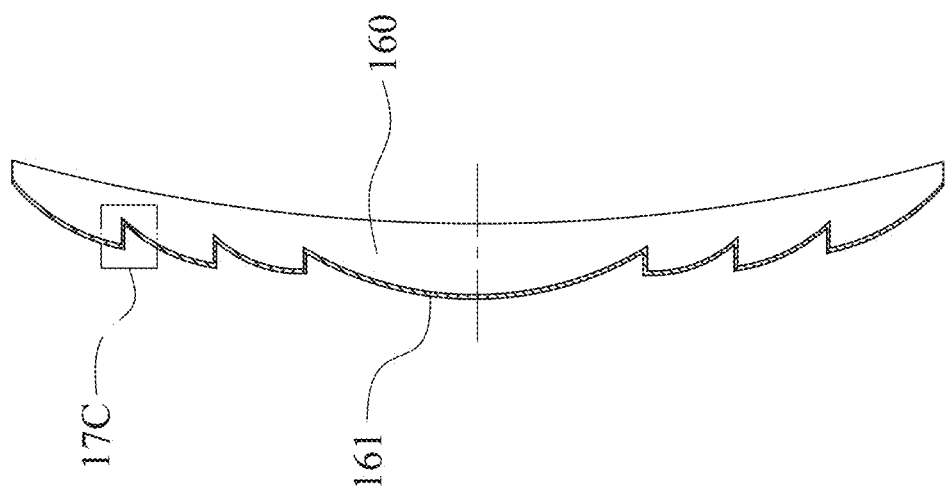
FIG. 18 is a schematic view of the Fresnel lens element in the imaging apparatus.

Please refer to FIG. 18. FIG. 18 is a schematic view of the Fresnel lens element 160 in the imaging apparatus. The imaging apparatus can further include the Fresnel lens element 160. At least one surface of the Fresnel lens element 160 can include an anti-reflective coating, and the anti-reflective coating of the Fresnel lens element 160 can be made of aluminum oxide. In the present embodiment, an object-side surface 161 of the Fresnel lens element 160 includes the anti-reflective coating, which has the detailed structure as shown in FIG. 17C.

In this regard, in the optical lens assembly with several optical lens elements of the present disclosure, the anti-reflective coating is prepared on the specific optical lens element with significant surface shape changes by the high-end coating technology. The anti-reflective coating thickness at the central region and the peripheral region of the optical lens element is highly consistent. Therefore, a uniform anti-reflective effect in the entire field of view is achieved, and the deviation of the reflectance waveform can be controlled within a small range, which is favorable for maintaining the uniformity of the anti-reflective efficiency, and the high requirement in specification and the high image quality of the optical lens assembly with several optical lens elements can be obtained. The present disclosure focuses on controlling the coating-arranging technique of the optical lens assembly. It is not only for performing the value of applications of the high-end coating technology, but also for obtaining the best manufacturing result of the anti-reflective coating. The uniform anti-reflective effect in the effective diameter region of the whole field of view of the optical lens element with significant surface shape changes can be obtained. Thus, the reflective problem of strong light at large angle can be reduced, and the image quality of the whole optical lens assembly can be enhanced.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly, comprising, from an object side to an image side:
   at least four optical lens elements;
   wherein at least one of the at least four optical lens elements comprises an anti-reflective coating, the at least one optical lens element comprising the anti-reflective coating is made of a plastic material, the anti-reflective coating is arranged on an object-side surface or an image-side surface of the at least one optical lens element comprising the anti-reflective coating, the anti-reflective coating comprises at least one coating layer, one of the at least one coating layer at the outer of the anti-reflective coating is made of ceramics, the anti-reflective coating comprises a plurality of holes, and sizes of the plurality of holes adjacent to the outer of the anti-reflective coating are larger than sizes of the plurality of holes adjacent to the inner of the anti-reflective coating;
   wherein a total thickness of the anti-reflective coating at a central region of the at least one optical lens element comprising the anti-reflective coating is Tc, a total thickness of the anti-reflective coating at a peripheral region of the at least one optical lens element comprising the anti-reflective coating is Tp, a major anti-reflective coating arranging factor of the optical lens assembly is FAR, and the following conditions are satisfied:

$|Tc-Tp|/Tc \leq 5.00\%$; and $-1.5 \leq FAR$.

2. The optical lens assembly of claim 1, wherein a first anti-reflective coating arranging factor of the optical lens assembly is Far1, and the following condition is satisfied:

$0.500 \leq Far1$.

3. The optical lens assembly of claim 2, wherein a second anti-reflective coating arranging factor of the optical lens assembly is Far2, and the following condition is satisfied:

$0.100 \leq Far2$.

4. The optical lens assembly of claim 3, wherein a third anti-reflective coating arranging factor of the optical lens assembly is Far3, and the following condition is satisfied:

$2.5 \leq Far3$.

5. The optical lens assembly of claim 1, wherein the at least one optical lens element comprising the anti-reflective coating is a substrate, a refractive index of the substrate is Ns, and the following condition is satisfied:

$Ns \leq 1.7682$.

6. The optical lens assembly of claim 5, wherein the coating layer at the outer of the anti-reflective coating is made of aluminum oxide ($Al_2O_3$).

7. The optical lens assembly of claim 6, wherein the anti-reflective coating comprises at least three coating layers, and the at least three coating layers are made of different materials.

8. The optical lens assembly of claim 1, wherein a wavelength with relatively low reflectance in a range of a reflectance trough at the central region of the at least one optical lens element comprising the anti-reflective coating is Wtc, a wavelength with relatively low reflectance in a range of a reflectance trough at the peripheral region of the at least one optical lens element comprising the anti-reflective coating is Wtp, and the following condition is satisfied:

$0 \text{ nm} \leq |Wtc-Wtp| \leq 25 \text{ nm}$.

9. The optical lens assembly of claim 8, wherein a relatively low reflectance in the range of the reflectance trough at the central region of the at least one optical lens element comprising the anti-reflective coating is Rtc, and the following condition is satisfied:

$0\% < Rtc \leq 0.300\%$.

10. The optical lens assembly of claim 9, wherein a relatively low reflectance in the range of the reflectance trough at the peripheral region of the at least one optical lens element comprising the anti-reflective coating is Rtp, and the following condition is satisfied:

$0\% < Rtp \leq 0.300\%$.

11. The optical lens assembly of claim 1, wherein a wavelength with relatively high reflectance in a range of a reflectance crest at the central region of the at least one optical lens element comprising the anti-reflective coating is Wcc, a wavelength with relatively high reflectance in a range of a reflectance crest at the peripheral region of the at least one optical lens element comprising the anti-reflective coating is Wcp, and the following condition is satisfied:

$0 \text{ nm} \leq |Wcc-Wcp| \leq 20 \text{ nm}$.

12. The optical lens assembly of claim 11, wherein a relatively high reflectance in the range of the reflectance crest at the central region of the at least one optical lens element comprising the anti-reflective coating is Rcc, and the following condition is satisfied:

$0.200\% \leq Rcc \leq 0.700\%$.

13. The optical lens assembly of claim 12, wherein a relatively high reflectance in the range of the reflectance crest at the peripheral region of the at least one optical lens element comprising the anti-reflective coating is Rcp, and the following condition is satisfied:

$0.200\% \leq Rcp \leq 0.700\%$.

14. The optical lens assembly of claim 1, wherein at least one surface of the at least one optical lens element comprising the anti-reflective coating comprises at least one inflection point.

15. The optical lens assembly of claim 1, wherein a total number of coating layers of the anti-reflective coating is tLs, and the following condition is satisfied:

$1 \leq tLs \leq 8$.

16. The optical lens assembly of claim 1, wherein a total thickness of coating layers of the anti-reflective coating is tTk, and the following condition is satisfied:

$200 \text{ nm} < tTk \leq 400 \text{ nm}$.

17. An imaging apparatus, comprising:
an optical lens assembly, comprising, from an object side to an image side:
at least four optical lens elements;
wherein at least one of the at least four optical lens elements comprises an anti-reflective coating, the at least one optical lens element comprising the anti-reflective coating is made of a plastic material, the anti-reflective coating is arranged on an object-side surface or an image-side surface of the at least one optical lens element comprising the anti-reflective coating, the anti-reflective coating comprises at least one coating layer, one of the at least one coating layer at the outer of the anti-reflective coating is made of ceramics, the anti-reflective coating comprises a plurality of holes, and sizes of the plurality of holes adjacent to the outer of the anti-reflective coating are larger than sizes of the plurality of holes adjacent to the inner of the anti-reflective coating;
wherein a total thickness of the anti-reflective coating at a central region of the at least one optical lens element comprising the anti-reflective coating is Tc, a total thickness of the anti-reflective coating at a peripheral region of the at least one optical lens element comprising the anti-reflective coating is Tp, a major anti-reflective coating arranging factor of the optical lens assembly is FAR, and the following conditions are satisfied:

$|Tc-Tp|/Tc \leq 5.00\%$; and $-1.5 \leq FAR$;

a Fresnel lens element, wherein at least one surface of the Fresnel lens element comprises an anti-reflective coating, and the anti-reflective coating of the Fresnel lens element is made of aluminum oxide; and
an image sensor disposed on an image surface of the optical lens assembly.

18. An imaging apparatus, comprising:
an optical lens assembly, comprising, from an object side to an image side:
at least four optical lens elements;
wherein at least one of the at least four optical lens elements comprises an anti-reflective coating, the at least one optical lens element comprising the anti-reflective coating is made of a plastic material, the anti-reflective coating is arranged on an object-side surface or an image-side surface of the at least one optical lens element comprising the anti-reflective coating, the anti-reflective coating comprises at least one coating layer, one of the at least one coating layer at the outer of the anti-reflective coating is made of ceramics, the anti-reflective coating comprises a plurality of holes, and sizes of the plurality of holes adjacent to the outer of the anti-reflective coating are larger than sizes of the plurality of holes adjacent to the inner of the anti-reflective coating;
wherein a total thickness of the anti-reflective coating at a central region of the at least one optical lens element comprising the anti-reflective coating is Tc, a total thickness of the anti-reflective coating at a peripheral region of the at least one optical lens element comprising the anti-reflective coating is Tp, a major anti-reflective coating arranging factor of the optical lens assembly is FAR, and the following conditions are satisfied:

$|Tc-Tp|/Tc \leq 5.00\%$; and $-1.5 \leq FAR$;

a curved lens element, wherein at least one surface of the curved lens element comprises a meta lens structure; and
an image sensor disposed on an image surface of the optical lens assembly.

19. An electronic device, which is a mobile device, and the electronic device comprising:
the imaging apparatus of claim 17.

20. An optical lens assembly, comprising, from an object side to an image side:
at least one optical lens element; and
at least one anti-reflective element;
wherein at least one surface of at least one of the at least one anti-reflective element comprises an anti-reflective coating, the at least one anti-reflective element comprising the anti-reflective coating is made of a glass material, the anti-reflective coating comprises at least two coating layers, one of the at least two coating layers closest to a substrate of the at least one anti-reflective element comprising the anti-reflective coating is a first coating layer, and a refractive index of the first coating layer is smaller than a refractive index of the substrate;
wherein one of the at least two coating layers at the outer of the anti-reflective coating is mainly made of aluminum oxide, the anti-reflective coating comprises a plurality of holes, sizes of the plurality of holes adjacent to the outer of the anti-reflective coating are larger than sizes of the plurality of holes adjacent to the inner of the anti-reflective coating, and a refractive index of the coating layer at the outermost of the anti-reflective coating is gradient;
wherein a total thickness of coating layers of the anti-reflective coating is tTk, and the following condition is satisfied:

200 nm$<tTk \leq$400 nm.

21. The optical lens assembly of claim 20, wherein the substrate is a planar lens element.

22. The optical lens assembly of claim 21, wherein a central thickness of the substrate is CTs, and the following condition is satisfied:

0.15 mm$<CTs \leq$0.60 mm.

23. The optical lens assembly of claim 22, wherein a third anti-reflective coating arranging factor of the optical lens assembly is Far3, and the following condition is satisfied:

$1.0 \leq Far3 \leq 5.0$.

24. The optical lens assembly of claim 23, wherein an average reflectance between a wavelength of 400 nm-630 nm of the substrate is R4063, and the following condition is satisfied:

$0\% \leq R4063 \leq 1.3\%$.

25. The optical lens assembly of claim 24, wherein an average reflectance between a wavelength of 670 nm-1000 nm of the substrate is R67100, and the following condition is satisfied:

$0\% \leq R67100 \leq 3.0\%$.

26. The optical lens assembly of claim 25, wherein an average transmittance between a wavelength of 400 nm-600 nm of the substrate is T4060, and the following condition is satisfied:

$95\% \leq T4060 \leq 100\%$.

27. The optical lens assembly of claim 26, wherein the anti-reflective coating comprises a second coating layer, a refractive index of the second coating layer is larger than the refractive index of the first coating layer, the refractive index of the second coating layer is larger than the refractive index of the substrate, and the refractive index of the coating layer at the outermost of the anti-reflective coating is equivalently smaller than the refractive indices of the first coating layer and the substrate.

28. The optical lens assembly of claim 20, wherein the substrate is a micro lens.

\* \* \* \* \*